United States Patent
Otsuka et al.

(10) Patent No.: US 10,407,101 B2
(45) Date of Patent: Sep. 10, 2019

(54) STRUCTURAL MEMBER

(71) Applicant: NIPPON STEEL & SUMITOMO METAL CORPORATION, Tokyo (JP)

(72) Inventors: Kenichiro Otsuka, Tokyo (JP); Yoshiaki Nakazawa, Tokyo (JP); Ryuichi Nishimura, Tokyo (JP); Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 71 days.

(21) Appl. No.: 15/535,755

(22) PCT Filed: Dec. 1, 2015

(86) PCT No.: PCT/JP2015/083816
§ 371 (c)(1),
(2) Date: Jun. 14, 2017

(87) PCT Pub. No.: WO2016/104078
PCT Pub. Date: Jun. 30, 2016

(65) Prior Publication Data
US 2017/0349217 A1 Dec. 7, 2017

(30) Foreign Application Priority Data

Dec. 22, 2014 (JP) .................. 2014-259479

(51) Int. Cl.
*B62D 21/15* (2006.01)
*B62D 25/20* (2006.01)
(Continued)

(52) U.S. Cl.
CPC .......... *B62D 21/157* (2013.01); *B62D 25/20* (2013.01); *B62D 29/007* (2013.01); *B62D 25/00* (2013.01); *B62D 25/025* (2013.01)

(58) Field of Classification Search
CPC ........ B62D 21/157; B62D 25/20; B60R 19/34
(Continued)

(56) References Cited

U.S. PATENT DOCUMENTS 9,199,670 B2 12/2015 Otsuka et al.
9,981,698 B2 * 5/2018 Maier ................ B62D 25/2018
(Continued)

FOREIGN PATENT DOCUMENTS

CN 102935864 A 2/2013
EP 2 716 525 A1 4/2014
(Continued)

OTHER PUBLICATIONS

Japanese Office Action, dated Jun. 26, 2018, for corresponding Japanese Application No. 2016-566071, with an English translation.
(Continued)

*Primary Examiner* — Jason S Morrow
(74) *Attorney, Agent, or Firm* — Birch, Stewart, Kolasch & Birch, LLP

(57) ABSTRACT

A structural member made of metal, formed so as to extend long in a predetermined direction, and having a gutter bottom, two ridges continuing to both ends in a width direction of the gutter bottom, and two vertical walls continuing to the two ridges, includes an outward continuous flange continuously formed at least along the gutter bottom, the ridges, and the vertical walls at an end in the predetermined direction, in which a width of the gutter bottom is reduced as a distance from the end having the outward continuous flange becomes larger.

6 Claims, 18 Drawing Sheets

(51) Int. Cl.
    *B62D 29/00*     (2006.01)
    *B62D 25/02*     (2006.01)
    *B62D 25/00*     (2006.01)

(58) Field of Classification Search
    USPC ............ 296/187.03, 187.08, 187.12, 193.07
    See application file for complete search history.

(56) References Cited

U.S. PATENT DOCUMENTS

| | | | |
|---|---|---|---|
| 2010/0148526 A1* | 6/2010 | Karlander | B60R 19/34 |
| | | | 293/155 |
| 2014/0284965 A1 | 9/2014 | Mildner | |
| 2014/0333091 A1* | 11/2014 | Stockard | B62D 21/155 |
| | | | 296/187.03 |
| 2014/0346790 A1* | 11/2014 | Kale | B60R 19/18 |
| | | | 293/133 |
| 2015/0061323 A1* | 3/2015 | Otsuka | B62D 21/157 |
| | | | 296/187.12 |
| 2015/0174634 A1 | 6/2015 | Nishimura et al. | |
| 2015/0232127 A1* | 8/2015 | Atsumi | B62D 25/20 |
| | | | 296/187.08 |
| 2016/0199897 A1* | 7/2016 | Otsuka | B21D 22/26 |
| | | | 72/352 |
| 2017/0001586 A1* | 1/2017 | Ashraf | B60R 19/34 |
| 2018/0141590 A1* | 5/2018 | Kellner | B62D 25/20 |

FOREIGN PATENT DOCUMENTS

| | | |
|---|---|---|
| GB | 2489548 A | 10/2012 |
| JP | 4-287777 A | 10/1992 |
| JP | 10-226307 A | 8/1998 |
| JP | 2006-193018 A | 7/2006 |
| JP | 2009-1227 A | 1/2009 |
| JP | 5041073 B2 | 10/2012 |
| RU | 71312 U1 | 3/2008 |
| TW | M417290 U1 | 12/2011 |
| TW | M443662 U1 | 12/2012 |
| TW | 201416265 A | 5/2014 |
| WO | WO 2010/073303 A1 | 7/2010 |
| WO | WO 2013/150736 A1 | 10/2013 |
| WO | WO 2013/154144 A1 | 10/2013 |
| WO | WO 2013/191256 A1 | 12/2013 |

OTHER PUBLICATIONS

Russian Office Action and Search Report, dated Jun. 4, 2018, for corresponding Russian Application No. 2017121804, with English translations.
Extended European Search Report, dated Jul. 19, 2018, issued in European Patent Application No. 15872647.1.
International Search Report for PCT/JP2015/083816 dated Jan. 26, 2016.
Office Action issued in TW 104141313 dated Oct. 20, 2016.
Written Opinion of the International Searching Authority for PCT/JP2015/083816 (PCT/ISA/237) dated Jan. 26, 2016.
Korean Office Action, dated May 17, 2018, for corresponding Korean Application No. 10-2017-7020210, with an English translation.
Office Action dated Aug. 28, 2018, in Chinese Patent Application No. 201580070474.6, with partial English translation.
Canadian Office Action, dated Sep. 14, 2018, for corresponding Canadian Application No. 2,969,555.

* cited by examiner

EXAMPLES 2 TO 10
COMPARATIVE EXAMPLE 3

COMPARATIVE EXAMPLES 4 TO 13

EXAMPLE 6(S=0.00115)

COMPARATIVE EXAMPLE 3(S=0)

COMPARATIVE EXAMPLE 8
(S=-0.00115)

CONTINUOUS FLANGE, REDUCED VERTICAL WALL

FLANGE WITH NOTCHES, REDUCED VERTICAL WALL

CONTINUOUS FLANGE, REDUCED GUTTER BOTTOM AND REDUCED VERTICAL WALL

FLANGE WITH NOTCHES, REDUCED GUTTER BOTTOM AND REDUCED VERTICAL WALL

STRUCTURAL MEMBER

TECHNICAL FIELD

The present invention relates to a structural member.

BACKGROUND ART

Body portions of structures, such as trains, automobiles, ships, and so forth, have hitherto been reinforced by combining a plurality of structural members. For example, the floor of an automotive body (hereinafter simply referred to as "floor") has rigidity not only for primarily resisting the torsion and bending of the vehicle body when the vehicle is driven, but also for transferring an impact load in case of collision of the vehicle. The floor also affects the weight of the automotive body significantly. Thus, the floor is required to have mutually contradicting properties, that is, a high rigidity and a light weight. The floor includes flat panels that are joined to each other by welding, vehicle widthwise members that have a substantially gutter-shaped cross section and are fixed to the flat panels along the vehicle widthwise direction, and vehicle longitudinal members that have a substantially gutter-shaped cross section and are fixed to the flat panels along the front-back direction of the vehicle body.

The flat panels include, for example, dash panels, front floor panels, and rear floor panels. The vehicle widthwise members are structural members that are disposed along the vehicle widthwise direction of these flat panels and fixed thereto by welding, etc., so as to increase the rigidity and strength of the floor. The vehicle widthwise members include, for example, floor cross members, and seat cross members. The vehicle longitudinal members are structural members that are disposed along the front-back direction of a vehicle body and fixed thereto by welding, etc., so as to increase the rigidity and strength of the floor. The vehicle longitudinal members include, for example, side sills, side members, and the like.

Among them, the structural members, such as the vehicle widthwise members and the vehicle longitudinal members, are typically joined to other members via outward flanges formed at the ends of the structural members. For example, a floor cross member, which is an example of the vehicle widthwise members, is joined to other members, such as a tunnel portion of a front floor panel and a side sill, via outward flanges that are formed at both ends of the floor cross member.

FIGS. 27 and 28 illustrate a floor cross member 1, which is a representative example of a member joined to other members with outward flanges 4 formed at both ends in the longitudinal direction of the member. FIG. 27 is a perspective view of the floor cross member 1 and FIG. 28 is a view on an arrow A in FIG. 27.

A front floor panel 2 is reinforced, for example, by a tunnel portion (not shown) that is joined to the upper surface (indoor-side surface) of the front floor panel 2, and also by a side sill 3 and the floor cross member 1. The tunnel portion is a structural member projecting toward the inside of a vehicle along the substantially widthwise center of the front floor panel 2. The side sill 3 is spot welded to the upper surface of the front floor panel 2 at each widthwise edge of the front floor panel 2. Both ends of the floor cross member 1 are spot welded to the tunnel portion and the side sill 3 via the outward flanges 4 formed at both ends in the longitudinal direction of the floor cross member 1. This improves the rigidity and the load transfer properties of the floor when an impact load is applied.

For example, Patent Literatures 1 and 2 each disclose a structural member for an automotive body that is disposed along the vehicle widthwise direction of an automobile and has a substantially gutter-shaped cross section including a gutter bottom, ridges, and vertical walls. The structural member described in Patent Literature 1 has such a shape that the height of the vertical walls becomes gradually larger toward an end of the structural member so as to match the shape of another member that is joined to the structural member at its opening end having a gutter-shape cross section. The structural member described in Patent Literature 2 has such a shape that the width of the gutter bottom becomes gradually larger toward an end of the structural member.

CITATION LIST

Patent Literature

Patent Literature 1: WO 2010/073303
Patent Literature 2: JP 2009-1227A

SUMMARY OF INVENTION

Technical Problem

For example, the floor cross member is an important structural member that performs a function to improve the rigidity of an automotive body and to absorb an impact load in case of a lateral collision event. Thus, a high-tensile steel sheet of smaller thickness and larger strength, such as, for example, a high-tensile steel sheet having a tensile strength of 390 MPa or more (high-strength steel sheet or high-tensile steel sheet), has been used as a material for the floor cross member in recent years, in an aim to reduce body weight and improve collision safety. However, there is still a strong demand for a floor cross member that has more-improved load transfer properties when an impact load is applied. To address the demand, it is necessary to improve the load transfer properties when an impact load is applied, not only by simply increasing the material strength but also by devising the shape of the floor cross member.

Each of the structural members disclosed in Patent Literatures 1 and 2 above has such a shape that the vertical wall or the gutter bottom becomes gradually larger toward the end. This shape, however, has not been adopted in view of improving load transfer properties. It is desired that structural members, not only for those for an automotive body but also for those equipped by other structures, be improved in load transfer properties when an impact load is applied by way of devising their shapes.

This invention is conceived in the above-described circumstances and is directed to provide a long structural member with a substantially gutter-shaped cross section that can be made light and also has excellent load transfer properties when an impact load is applied.

Solution to Problem

In order to solve the above problem, according to an aspect of the present invention, there is provided a structural member made of metal, formed so as to extend long in a predetermined direction, and having a gutter bottom, two ridges continuing to both ends in a width direction of the gutter bottom, and two vertical walls continuing to the two ridges, the structural member including: an outward continuous flange continuously formed at least along the gutter bottom, the ridges, the vertical walls at an end in the predetermined direction, in which a width of the gutter bottom is reduced as a distance from the end having the outward continuous flange becomes larger.

A value S (mm$^{-1}$) that represents a degree of width reduction of the gutter bottom as defined in formula (1) below may be in a range from 0.0002 to 0.0018, $$S(mm^{-1}) = \{(Wa - Wb)/Wa\}/L \quad (1)$$

where Wa represents a width of the gutter bottom at a base portion at the end having the outward continuous flange, and Wb represents a width of the gutter bottom at a position having an arbitrary distance L from the base portion in an extent in which the width of the gutter bottom becomes smaller.

The width of the gutter bottom may become smaller in an extent in which the distance from the end having the outward continuous flange is 100 mm or more.

The structural member for an automotive body may be joined to another member via the outward continuous flange by using resistance spot welding, penetration laser welding, arc fillet welding, adhesion using an adhesive, or a combination thereof.

The structural member may be formed of a high-tensile steel sheet having a tensile strength of 390 MPa or more.

The structural member may be a structural member for a vehicle.

The structural member for a vehicle may be a floor cross member, a side sill, a front side member, or a floor tunnel brace.

Advantageous Effects of Invention

According to the present invention, providing the outward continuous flange at an end in a predetermined direction of the structural member can restrain stress from being concentrated at the ends of the ridges at an initial stage of crushing along the axial direction, thereby enabling the stress to be dispersed to other portions. This reduces the strain produced in the ends of the ridges and thereby improves load transfer properties. Moreover, buckling pitch becomes smaller at an intermediate or later stage of crushing in the axial direction by gradually reducing the width of the gutter bottom as the distance from the end having the outward continuous flange becomes larger. Thus, excellent load transfer properties are maintained also in the intermediate or later stage of crushing, which can increase the impact energy absorption amount. Furthermore, the structural member can be made lighter by gradually reducing the width of the gutter bottom as the distance from the end having the outward continuous flange becomes larger. Thus, according to the invention, the structural member that is light in weight and excellent in load transfer properties when an impact load is applied can be obtained.

DESCRIPTION OF EMBODIMENTS

Figure 1:
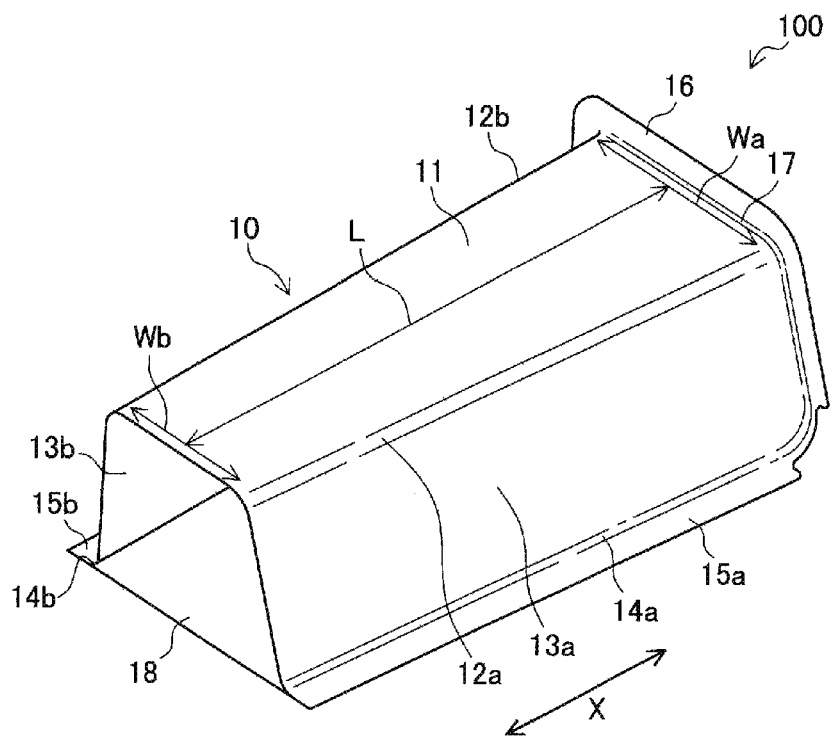
FIG. 1 is a view illustrating a configuration example of a structural member (first member) according to an embodiment.

Hereinafter, (a) preferred embodiment(s) of the present invention will be described in detail with reference to the appended drawings. In this specification and the appended drawings, structural elements that have substantially the same function and structure are denoted with the same reference numerals, and repeated explanation of these structural elements is omitted.

<1. Structural Member>

(1-1. Configuration Example)

FIG. 1 is a view illustrating an example of a structural member (hereinafter referred to also as "first member") 10 according to an embodiment. FIG. 1 is a perspective view illustrating a joined structure 100 formed by joining a first member 10 and a second member 18.

Structural members to which the present invention can be applied include, for example, reinforcing members for chassis of vehicles, including automobiles, trains, and motorcycles as representative examples, or for structures, such as hulls of ships and the like. Such reinforcing members may be crushed so as to absorb the impact energy and to relieve the impact on passengers, etc., when an impact load is applied. The structural member (first member) 10 will be described below by taking a structural member for an automotive body as an example.

The first member 10 can be used as, for example, a floor cross member, a side sill, a front side member, or a floor tunnel brace. When the first member 10 is used as a reinforcing member for an automotive body, such as the floor cross member, the side sill, the front side member, the floor tunnel or the like, a high-tensile steel sheet having a tensile strength of 390 MPa or more, which is measured by tensile testing in accordance with JIS Z 2241, may be used as a forming material. The tensile strength of the high-strength steel sheet may be 590 MPa or more, or may be 780 MPa or more.

Note that the "structural member", as used herein, denotes the first member 10 itself while a composite structure in which the second member 18 is joined to the first member 10 is denoted by "the joined structure 100". For example, when the first member 10 is used as a floor cross member, a floor panel corresponds to the second member 18. On the other hand, when the first member 10 is used as a side sill, the side sill is formed as a joined structure 100 in which the first member 10 is joined to a closing plate or to a second member 18 having a substantially gutter-shaped cross section that is similar to the first member.

Moreover, when the first member 10 is used as a front side member, the front side member is generally formed of a cylindrically-shaped joined member made of the first member 10 and the second member 18, as is similar to the side sill. However, in the case of the front side member, a hood ridge panel, for example, corresponds to the second member 18, and the first member 10 itself, which is joined to the hood ridge panel, is sometimes referred to as the front side member.

The first member 10 is a long member formed so as to extend in a predetermined direction indicated by an arrow X in FIG. 1 (hereinafter referred to as "axial direction"). The first member 10 has a gutter bottom 11, ridges 12a and 12b, vertical walls 13a and 13b, curved sections 14a and 14b, and flanges 15a and 15b. The two ridges 12a, 12b are formed continuing to both widthwise ends of the gutter bottom 11. The two vertical walls 13a, 13b are formed continuing to the two ridges 12a, 12b, respectively. The two curved sections 14a, 14b are formed continuing to the two vertical walls 13a, 13b, respectively. The two flanges 15a, 15b are formed continuing to the two curved sections 14a, 14b, respectively.

In addition, the two flanges 15a, 15b are joined to a second member 18 such as a closing plate or a formed panel that constitutes an automotive body (for example, floor panel). In this way, the first member 10 and the second member 18 form a closed cross section. Note that the curved section 14a, 14b continuing to the vertical walls 13a, 13b and the flanges 15a, 15b continuing to the curved section 14a, 14b may be omitted from the structural member according to the present embodiment.

In the first member 10, the ridges 12a, 12b serve as portions for bearing loads when an impact load against the first member 10 is applied in the axial direction. Thus, it is necessary to efficiently transfer the load applied to the first member 10 to the ridges 12a, 12b. It is also necessary to stabilize the absorption amount of impact energy so as to allow the first member 10 to absorb the impact energy efficiently. For this purpose, it is desirable that buckling pitch in the first member 10 generated by crushing in the axial direction become small.

There is no particular limitation to a method for joining the first member 10 and the second member 18 via the flanges 15a, 15b, as far as the joining strength is guaranteed. It is practical and also typical to use a joining method with which a plurality of points are spot welded along the longitudinal direction of the joined structure 100. However, a joining method such as laser welding or other joining methods may be used depending on flange width and other requirements.

(1-2. Outward Continuous Flange)

The first member 10 according to the present embodiment has an outward continuous flange 16 at a longitudinal end thereof. The outward continuous flange 16 is formed at the longitudinal end of the first member 10 via a curved rising surface 17 having a curvature radius of r (mm). In the first member 10 illustrated in FIG. 1, the outward continuous flange 16 is formed so as to continue from the gutter bottom 11 to the ridges 12a, 12b and further to the vertical walls 13a, 13b along the peripheral direction of the cross section at the longitudinal end of the first member 10. Note that the term "outward flange", as used herein, refers to a flange formed such that an end of the first member 10 having a substantially gutter-shaped cross section is bent outward from the gutter, and the term "outward continuous flange" refers to an outward flange that is formed so as to continue at least over the ridges 12a, 12b from the gutter bottom 11.

The outward continuous flange 16 is used for joining the first member 10 to another member (not shown). For example, the first member 10 is joined, by spot welding, etc., to another member formed of a press-formed steel product, via the outward continuous flange 16 at an end in the axial direction of the first member 10. The first member 10 is joined to another member by using, for example, resistance spot welding, penetration laser welding, arc fillet welding, or the combination thereof. Joining the first member 10 to another member may be achieved by adhesion using an adhesive or by the combination of welding and adhesion.

By providing the first member 10 with the outward continuous flange 16, stress concentration in the ridges 12a, 12b at the end of the first member 10 can be reduced at an initial stage of crushing in the axial direction of the first member 10 (for example, at a crush stroke of 5 mm or less). Consequently, the strain produced in the ends of the ridges 12a, 12b becomes smaller, and when an impact load is applied, the load transfer properties of the first member 10 along the axial direction are improved.

It is sufficient that the outward continuous flange 16 is formed so as to continue at least from the gutter bottom 11 to the ridges 12a, 12b at a longitudinal end of the first member 10. Alternatively, the outward continuous flange 16 may be formed so as to continue from the gutter bottom 11 to the vertical walls 13a, 13b at a longitudinal end of the first member 10. Moreover, the outward continuous flange 16 may be separated at a position corresponding to the gutter bottom 11 at a longitudinal end of the first member 10.

The outward continuous flange 16 need not be formed all over the portions corresponding to the gutter bottom 11 and the vertical walls 13a, 13b. It is sufficient that the outward continuous flange 16 is formed at least on a portion of the gutter bottom 11 or the vertical walls 13a, 13b that continues to the ridges 12a, 12b. The outward continuous flange 16 makes it easier to disperse the load applied to the ridges 12a, 12b, and thus can reduce stress concentration in the ridges 12a, 12b.

Regarding the flange width of the outward continuous flange 16, the outward continuous flange 16 that is formed of a high-tensile steel sheet and has a flange width of 25 mm or more can still be formed while reducing wrinkle and crack generation, according to a manufacturing method of the structural member, which will be described later. The flange width may be 13 mm or more from a viewpoint, for example, of making spot welding easier when the first member 10 is joined to another member by using the outward continuous flange 16.

Note that the outward continuous flange 16 is a flange that does not have notches in positions corresponding to the ridges 12a, 12b. Thus, the rigidity and collision-safety capability of the first member 10 can be maintained even if the flange width of the outward continuous flange 16 is 13 mm or less. From a viewpoint of maintaining collision-safety capability, the flange rising angle, which is an angle between the outward continuous flange 16 and the gutter bottom 11 or the vertical wall 13a or 13b, may be 60° or more. Note that the phrase "provide a notch in a flange" is meant to provide a notch formed all the way in the width direction of the flange, which makes the flange discontinuous. The term "the width of a flange" is used to have the same meaning as the height of the flange. In the case that the width of the flange is made small partially but part of the flange still remains, the flange is not meant to have the notch.

Moreover, the width of the outward continuous flange 16 may not be constant over the whole circumference. For example, the flange width in the region corresponding to each ridge 12a, 12b of the outward continuous flange 16 may be made small as compared to other regions. At the end of the ridges 12a, 12b, the outward continuous flange 16 is vulnerable to cracking at the edge of the flange and wrinkling at the base of the flange during press forming. Accordingly, the smaller the flange width, the easier the press forming at the regions corresponding to the ridges 12a, 12b. However, according to the manufacturing method of the structural members, the wrinkle and crack generation can be reduced even if the flange width is relatively large at the regions corresponding to the ridges 12a, 12b.

(1-3 End-Spread Portion)

The first member 10 according to the present embodiment also includes an end-spread portion T having a shape in which the width W of the gutter bottom 11 is gradually reduced along the axial direction as the distance from the end having the outward continuous flange 16 becomes larger. Providing the first member 10 with the end-spread portion T allows buckling to be generated successively from the end of the first member 10. In addition, by providing the first member 10 with the end-spread portion T, the buckling pitch accompanying the crushing of the first member 10 is made smaller and the number of buckling portions becomes larger at an intermediate or later stage of crushing (for example, at a crush stroke of 5 mm or more) along the axial direction of the first member 10, which can stabilize the absorption amount of impact energy.

This further improves the load transfer properties when an impact load is applied. Moreover, providing the first member 10 with the end-spread portion T allows the weight of the first member 10 to be reduced if the end having the outward continuous flange 16 has the same circumference of the cross section (hereinafter referred to as "cross-sectional circumference"). Furthermore, providing the first member 10 with the end-spread portion T can alleviate stress concentration at the end having the outward continuous flange 16, which serves as a joining portion with another member, when the vehicle body is subjected to torsion and bending. This can improve the rigidity against the torsion and bending of the vehicle body.

Here, if the degree of reduction of the width W of the gutter bottom 11 is too small, the effect of stabilizing the impact energy absorption amount and the effect of reducing the weight cannot be easily obtained. On the other hand, if the degree of width reduction of the width W of the gutter bottom 11 is too large, the first member 10 is made lighter, but the cross-sectional circumference of the first member 10 becomes too small, leading to a concern that the impact energy absorption amount is reduced. Thus, when value S ($mm^{-1}$) represents the degree of reduction of the width W of the gutter bottom 11 in the first member 10 as defined in formula (1) below, the value S ($mm^{-1}$) may be in a range of 0.0002 to 0.0018, and may further be in a range of 0.0004 to 0.0015.

$$S(mm^{-1}) = \{(Wa - Wb)/Wa\}/L \quad (1)$$

where

Wa: the width of the gutter bottom 11 at the base portion at the end having the outward continuous flange 16, and Wb: the width of the gutter bottom 11 at a position that has an arbitrary distance L from the base portion and is located within the extent in which the width of the gutter bottom 11 continues to narrow.

Note that when the reduction rate of the width W of the gutter bottom 11 changes along the axial direction, the foregoing value S of the degree of reduction is defined as the average of values S obtained from a plurality of distances L. The average of values S of the degree of reduction can be obtained, for example, by averaging values S each of which is calculated with the corresponding distance L using the foregoing formula (1) while the distance L is increased by an increment of 10 mm within the extent in which the end-spread portion T is provided.

The extent in which the end-spread portion T is provided in the first member 10 along the axial direction can be established in accordance with the displacement amount of the first member 10 in the axial direction when an impact load is applied. For example, when the first member 10 is a floor cross member and a maximum displacement of the first member 10 is 100 mm, the extent in which the end-spread portion T is provided can be 100 mm or more from the border portion between the gutter bottom 11 and the curved rising surface 17.

If the extent in which the end-spread portion T is provided is too long, the cross-sectional circumference of the first member 10 at a position distant from the end having the outward continuous flange 16 may become too small to bear the impact load. Thus, when the first member 10 is, for example, the floor cross member, the extent in which the end-spread portion T is provided may be 300 mm or less.

<2. Method of Manufacturing Structural Member>

The configuration of the first member 10 as a structural member for an automotive body according to the present embodiment has been so far described. There is no specific limitation on the manufacturing method or the manufacturing apparatus of the first member 10. However, when the first member 10 is manufactured by using a metal sheet, especially using a high-tensile steel sheet, the first member 10 is vulnerable, due to constraints in press forming, to crack generation in the edge of the flange formed continuing to each end of the ridges 12a, 12b and wrinkle generation near the base of the flange in the vicinity of the ends of the ridges 12a, 12b in the outward continuous flange 16.

Figure 28:
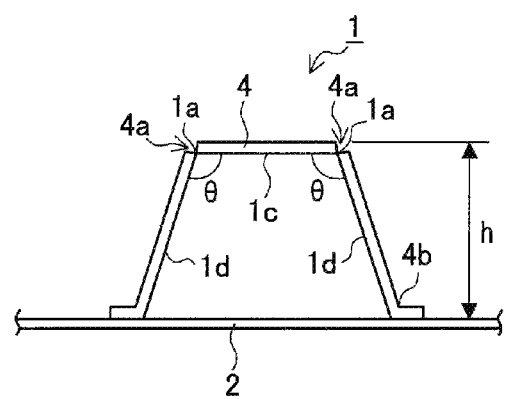
FIG. 28 is a view on an arrow A in FIG. 27.

These defects during forming occur more frequently as the material strength of the forming material becomes larger and as the flange is shaped such that stretch flanging rate during forming becomes higher at positions corresponding to the ridges (i.e., the bending angle θ of the ridge 1a in FIG. 28 is sharper). Moreover, these defects during forming occur more frequently as the height of the first member 10 (height h in FIG. 28) becomes larger. The foregoing wrinkle is generated more often especially in the case of the first member 10 having the end-spread portion T.

Now, an example of the method of manufacturing the structural member that can press form the first member 10 using a high-tensile steel sheet while reducing cracking at edges and wrinkling will be described. A method of manufacturing the structural member will be outlined first, and then a configuration example of a press-forming apparatus and an example of the method of manufacturing the structural member will be described in detail.

(2-1. Outline of Manufacturing Method)

Now, an example of the method of manufacturing the structural member by using press forming is outlined. The exemplary method of manufacturing the structural member, which will be described below, includes a first step carried out by using a first press-forming apparatus and a second step carried out by using a second press-forming apparatus.

(2-1-1. Outline of First Step)

The first step is carried out by using a first press-forming apparatus. In the first step, a first pad presses at least part of a portion to be formed into the gutter bottom in a forming material. By doing so, the end of the forming material that continues to the portion to be formed into the gutter bottom, is raised in a direction opposite to the pressing direction of the first pad. The first pad subsequently presses the forming material against a first punch so that at least part of the portion to be formed into the gutter bottom is restrained by the first pad and the first punch.

After the portion to be formed into the gutter bottom in the forming material is restrained by the first pad, a second pad, which is different from the first pad, presses at least part of the longitudinal end of a portion to be formed into each of the ridges in the forming material. By doing so, the end of the forming material, which continues to the portion to be formed into each ridge, is raised in a direction opposite to the pressing direction of the second pad. While the second pad subsequently bends the portion to be formed into the ridge in the forming material along the pressing direction of the second pad, the second pad and the first punch restrain at least part of the portion to be formed into the ridge.

Subsequently, a first die is moved closer to the first punch to press form the forming material while the forming material is restrained by the first and second pads and the first punch. The above-described first step forms an intermediate product that has the outward continuous flange in a longitudinal end while reducing crack generation in the flange and reducing wrinkle generation in the vicinity of the ends of the ridges.

(2-1-2. Outline of Second Step)

The second step is carried out by using a second press-forming apparatus, which is different from the first press-forming apparatus. In the first step, the first pad restraining the portion to be formed into the gutter bottom and the second pad restraining the portions to be formed into the ridges have been used. Consequently, there remains part of the press forming material that has not been completely pressed by the first die and the first punch. Thus, in the second step, the intermediate product is press formed into a structural member by using a second punch and a second die.

The second press-forming apparatus may be a type of apparatus capable of press forming the portion that the first press-forming apparatus cannot form completely. To be specific, the second press-forming apparatus may be a type of apparatus capable of press forming the regions that have not been restrained by the first pad or the second pad in the portions to be formed into the gutter bottom, the ridges, and the vertical walls. Alternatively, the second press-forming apparatus may be a type of apparatus that press forms the part of the outward continuous flange that the first press-forming apparatus cannot form completely. The second press-forming apparatus can be formed of a known press-forming apparatus having a die and punch.

(2-2. Manufacturing Apparatus)

Figure 2:
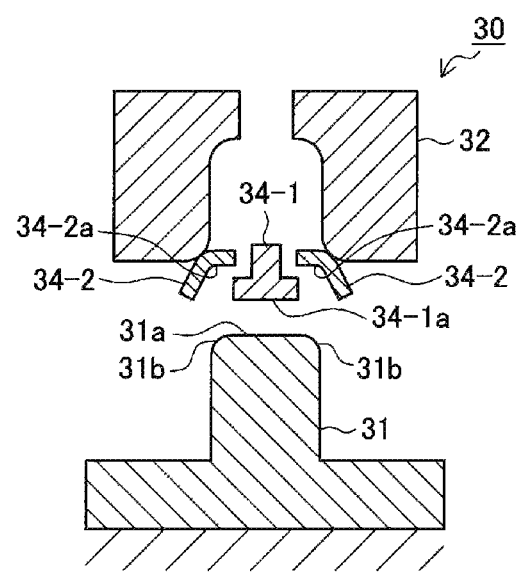
FIG. 2 is a cross-sectional view illustrating an example of a first press-forming apparatus.
Figure 3:
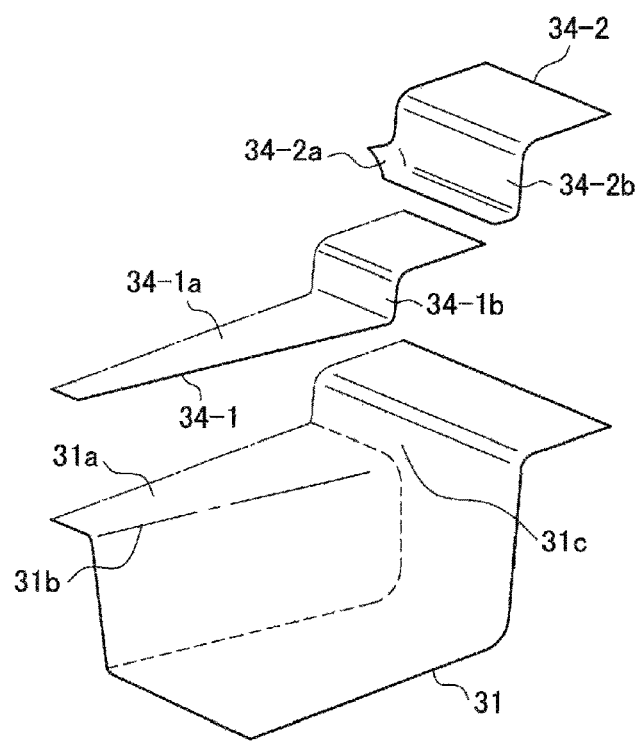
FIG. 3 is a perspective view illustrating an example of the first press-forming apparatus.

Now, a configuration example of the press-forming apparatus will be described. FIG. 2 and FIG. 3 are each a diagram for schematically illustrating an exemplary first press-forming apparatus 30. FIG. 2 is a sectional view outlining part of a first press-forming apparatus 30 that forms the end region of an intermediate product, and FIG. 3 is a perspective view outlining the first press-forming apparatus 30. FIG. 3 illustrates half portions of a first punch 31 and a first pad 34-1, which are divided in half at the center line along the longitudinal direction of the intermediate product to be formed.

The first press-forming apparatus 30 has a first punch 31, a first die 32, and a first pad 34-1 and second pads 34-2 which oppose the first punch 31. The first press-forming apparatus 30 is fundamentally configured to press form a forming material by moving the first die 32 closer to the first punch 31 with the forming material being restrained by the first pad 34-1 and the second pads 34-2 and the first punch 31.

The first punch 31 has punch surfaces on the sides opposing the first die 32, the first pad 34-1, and the second pad 34-2. The first punch 31 has an upper surface 31a, shoulders 31b for forming the ridges of the intermediate product, and a flange-forming part 31c.

The first pad 34-1 has a restraining surface 34-1a and a flange-forming part 34-1b. The restraining surface 34-1a of the first pad 34-1, which is disposed opposing the upper surface 31a of the punch 31, presses the forming material against the upper surface 31a of the punch 31 and restrains the forming material. The part of the forming material that is restrained by the restraining surface 34-1a and the upper surface 31a is the portion to be formed into the gutter bottom. The restrained part of the forming material may be the whole portion or part of the portion to be formed into the gutter bottom. However, at least the vicinity of the end on the side having the outward continuous flange in the portion to be formed into the gutter bottom is made to be restrained. The flange-forming part 34-1b of the first pad 34-1 presses the forming material against the flange-forming part 31c of the punch 31. By doing so, the flange portion to be formed at the end of the gutter bottom in the forming material is bent upward.

Each of the second pads 34-2 has a restraining surface 34-2a and a flange-forming part 34-2b. The second pad 34-2 is disposed in such a manner that it does not interfere with the first pad 34-1 in press forming. The restraining surface 34-2a of the second pad 34-2, which is disposed opposing the shoulder 31b of the punch 31, presses and then restrains the forming material against the shoulder 31b of the punch 31. The part of the forming material restrained by the restraining surface 34-2a and the shoulder 31b is at least part of the end region of the portion to be formed into each ridge. The flange-forming part 34-2b of the second pad 34-2 presses the forming material against the flange-forming part 31c of the punch 31. By doing so, the flange portion to be formed at the end of each ridge in the forming material is bent upward.

The second pad 34-2 restrains the portion to be formed into the ridge in the vicinity of the outward continuous flange while the portion to be formed into the gutter bottom is restrained by the first pad 34-1. Accordingly, the shape of the ridge in the vicinity of the outward continuous flange is formed by projecting outward the material approximately in the region pressed by the second pad 34-2. This reduces the movement of the material surrounding the region touched by the second pad 34-2, and thus reduces stretch or shrinkage deformation of the surrounding material, which otherwise causes cracking and wrinkling. This can consequently reduce the crack generation of stretched flange in the region in the outward continuous flange that corresponds to the ridge, and the wrinkle generation at the ridge near the base of the flange in the vicinity of the end of the ridge.

In addition, the second pad 34-2 is aimed at forming the ridge by projecting outward the material in the vicinity of the outward continuous flange and thereby achieving an effect of reducing the movement of the surrounding material. For this purpose, the second pad 34-2 may restrain the whole portion to be formed into the ridge, starting from the border between the portion to be formed into the gutter bottom and the portion to be formed into the ridge, in the vicinity of the portion to be formed into the outward continuous flange.

More specifically, it is preferable that the region of the forming material that is restrained by the restraining surface 34-2a of the second pad 34-2 include the border between the portion to be formed into the gutter bottom and the portion to be formed into the ridge. The second pad 34-2 may press a region of at least ⅓ of the cross-sectional circumference starting from the foregoing border in each of the portions to be formed into the ridges 12a, 12b. Part of each ridge 12a, 12b can be formed by pressing the foregoing region by the second pad 34-2 while reducing the movement of the surrounding steel sheet material and projecting outward the steel sheet material in the region pressed by the restraining surface 34-2a of the second pad 34-2. It should be noted that each of the second pads 34-2 may be configured to press the ridge and part of the vertical wall, for example, to press a region of 20 mm or less long in the vertical wall that continues to the ridge.

Other properties of the first pad 34-1 and the second pads 34-2, such as dimension and material, can be the same as those of pads known in the art.

The first die 32 is moved closer to the first punch 31 to press form the forming material with the forming material being restrained by the first pad 34-1 and the second pads 34-2. The first die 32 is disposed in such a manner that it does not interfere with the first pad 34-1 and the second pads 34-2 during press forming. The first pad 34-1, the second pads 34-2, and the first die 32 are preferably arranged with a minimum space therebetween with respect to the pressing direction.

The first press-forming apparatus 30 is configured to allow the first pad 34-1, the second pads 34-2, and the first die 32 to press the forming material in this order. In other words, each of the second pads 34-2 restrains the end region in the portion to be formed into the ridge after at least part of the portion to be formed into the gutter bottom is restrained by the first pad 34-1. The first die 32 subsequently press forms the forming material with the forming material being restrained by the first pad 34-1 and the second pads 34-2.

This configuration can be obtained, for example, by suspending the first pad 34-1 and the second pads 34-2 from the die 32 with coil springs. More specifically, the restraining surface 34-1a of the first pad 34-1, the restraining surfaces 34-2a of the second pads 34-2, and the press surface of the first die 32 are arranged in this order from the first punch 31 in a state before the press forming starts. By moving the first die 32 toward the first punch 31, the first die 32 press forms the forming material after the first pad 34-1 and the second pads 34-2 consecutively come into contact with, and then restrain, the forming material in this order. Subsequently, the first die 32 press forms the forming material.

It should be noted that one or all of the first pad 34-1, the second pads 34-2, and the first die 32 may be configured to be able to move independently toward the first punch 31. In this case, the order of contact with the forming material is controlled by controlling each movement of the first pad 34-1, the second pads 34-2, and the first die 32.

Note that, due to the presence of the first pad 34-1 or the second pads 34-2, there remain regions in which the first die 32 cannot press the forming material against the first punch 31. For example, the first die 32 cannot press form the vertical walls and the flanges that are overlapped by the second pads 34-2 in the pressing direction. These regions are press formed by using the second press-forming apparatus in the second step. The second press-forming apparatus can be configured using a press-forming apparatus known in the art, and thus further description thereon is omitted.

(2-3. Manufacturing Method)

Next, an exemplary method of manufacturing the structural member will be described specifically. The method of manufacturing the structural member described below is an example of manufacturing the first member 10 having the outward continuous flange 16 and the end-spread portion T as shown in FIG. 1 by way of example.

(2-3-1. First Step)

Figure 4:
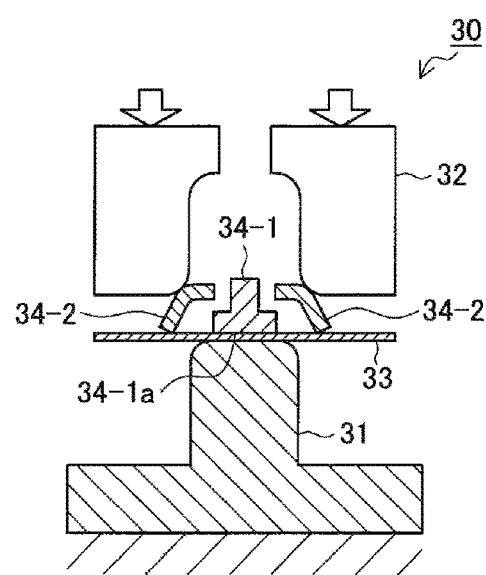
FIG. 4 is a cross-sectional view illustrating a state in which a first pad restrains a portion to be formed into a gutter bottom.
Figure 5:
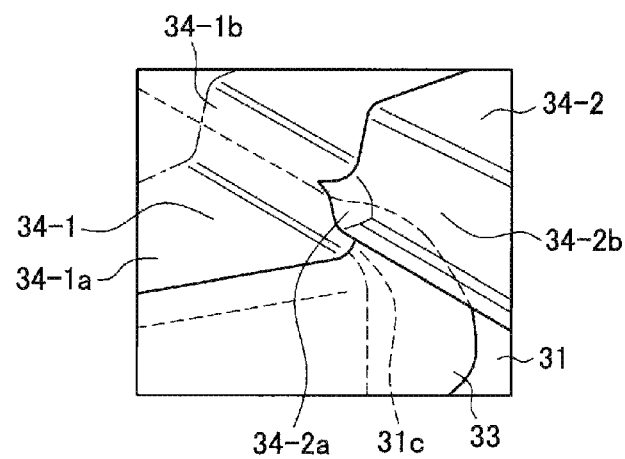
FIG. 5 is a perspective view illustrating a state in which the first pad restrains a portion to be formed into the gutter bottom.
Figure 6:
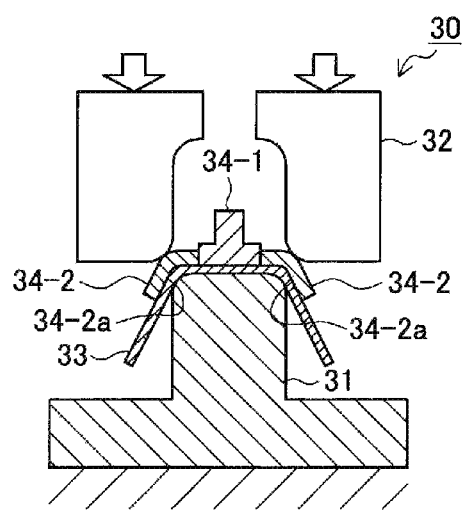
FIG. 6 is a cross-sectional view illustrating a state in which second pads restrain portions to be formed into ridges.
Figure 7:
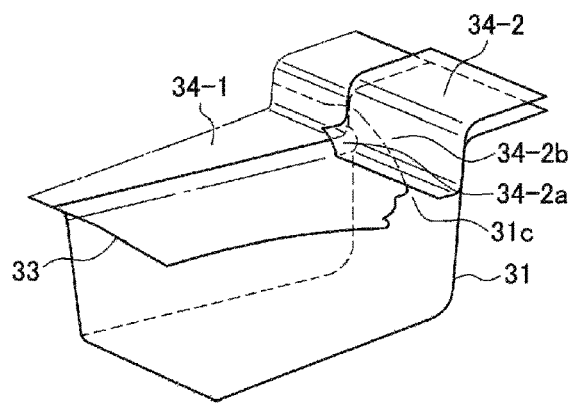
FIG. 7 is a perspective view illustrating a state in which a second pad restrain a portion to be formed into a ridge.
Figure 8:
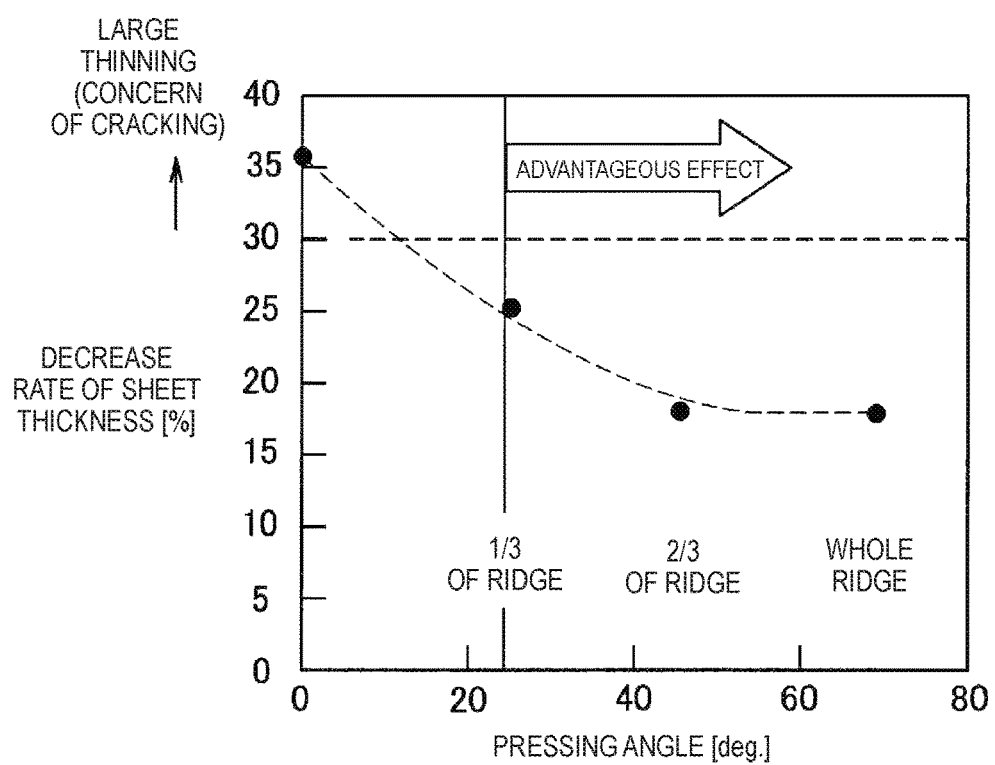
FIG. 8 is a characteristic diagram illustrating a relationship between a pressed extent by a second pad in a portion to be formed into a ridge and a maximum value of a decrease rate of a sheet thickness in the edge of a flange in an end of a ridge.
Figure 9:
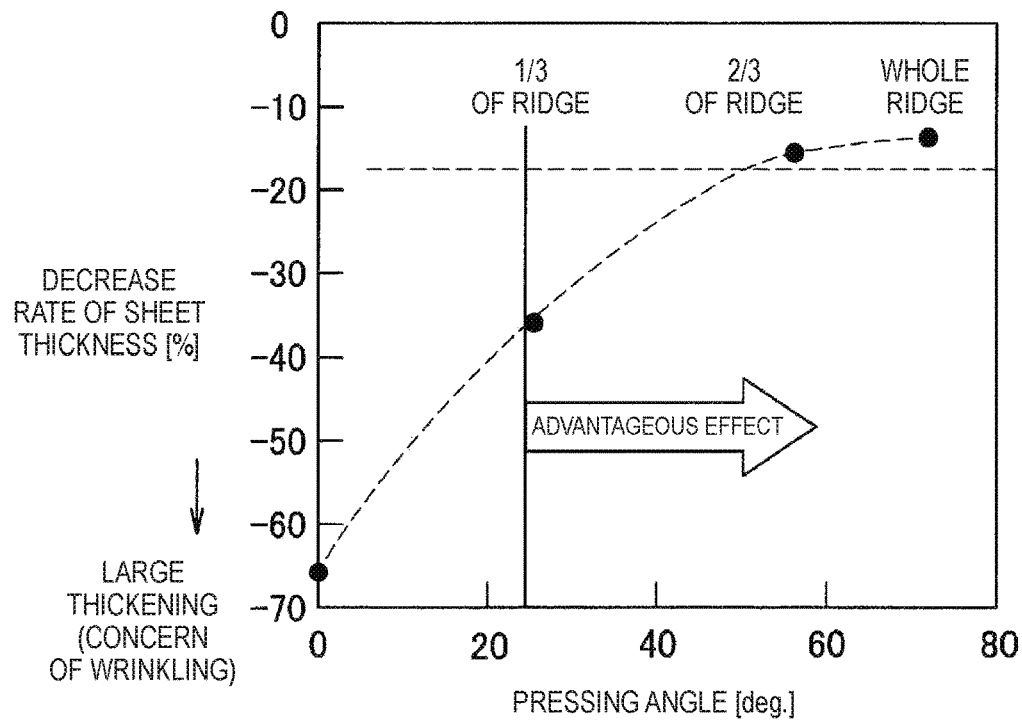
FIG. 9 is a characteristic diagram illustrating a relationship between a pressed extent by a second pad in a portion to be formed into a ridge and a minimum value of a decrease rate of a sheet thickness near the base of a flange in an end of a ridge.
Figure 10:
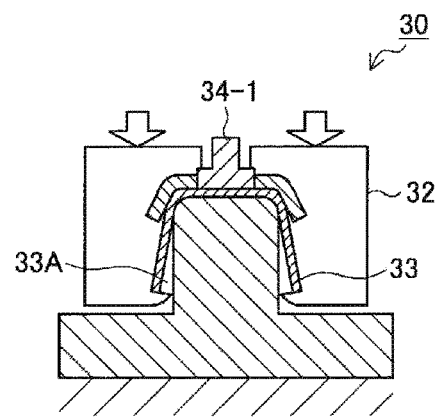
FIG. 10 is a cross-sectional view illustrating a state in which a forming material is press formed by a die and punch.

FIGS. 4 to 10 are each a schematic view illustrating a first step carried out by using the first press-forming apparatus 30 as described above. FIGS. 4 and 5 are a cross-sectional view and a perspective view, schematically illustrating a state in which a forming material 33 is restrained by the first pad 34-1. FIGS. 6 and 7 are also a cross-sectional view and a perspective view, schematically illustrating a state in which the forming material 33 is restrained by the second pad 34-2. FIG. 10 is a cross-sectional view schematically illustrating a state in which the forming material 33 is press formed by the first die 32.

Note that FIGS. 4 to 10 each illustrate a state in the first step in which the first member 10 having an end-spread shape is manufactured. In addition, FIG. 4, FIG. 6, and FIG. 10 each illustrate a state in which an end region in the longitudinal direction in the forming material 33, which is to be formed into the outward continuous flange 16, is formed in the first step. FIGS. 5 and 7 each illustrate a half portion of the first punch 31, the first pad 34-1, and the forming material 33, which are divided in half at the center line along the longitudinal direction of an intermediate product to be formed. Moreover, the manufacturing method as described below uses the first press-forming apparatus 30 in which the first pad 34-1 and the second pads 34-2 are suspended from the first die 32.

In the first step as illustrated in FIGS. 4 and 5, the first pad 34-1 restrains the portion to be formed into the gutter bottom 11 in the forming material 33, as the first die 32 moves toward the first punch 31. At this time, as illustrated in FIG. 5, the restraining surface 34-1a of the first pad 34-1 restrains at least part of the portion to be formed into the gutter bottom 11 in the forming material 33. At the same time, a longitudinal end of the forming material 33 is raised in a direction opposite to the pressing direction, and then restrained by the flange-forming part 34-1b of the first pad 34-1 and the flange-forming part 31c of the first punch 31.

Subsequently, as the first die 32 moves further toward the first punch 31, the second pads 34-2 restrain the portions to be formed into the ridges 12a, 12b in the forming material 33, as illustrated in FIGS. 6 and 7. At this time, the restrained region in the forming material 33 is a region in the vicinity of the end of the portion to be formed into each of the ridges 12a, 12b. In other words, the restraining surface 34-2a of each second pad 34-2 restrains the end of the portion to be formed into each ridge 12a, 12b in the forming material 33, as illustrated in FIG. 7. At the same time, the portion to be formed into the flange, which continues to the portion to be formed into each ridge 12a, 12b, is further raised in the direction opposite to the pressing direction, and then restrained by the flange-forming part 34-2b of the second pad 34-2 and the flange-forming part 31c of the first punch 31.

At this time, the second pad 34-2 may press a region of at least ⅓ of the cross-sectional circumference starting from the foregoing border in the portion to be formed into each ridge 12a, 12b. Part of each ridge 12a, 12b can be formed by pressing the foregoing region by the second pad 34-2 while reducing the movement of the surrounding steel sheet material and projecting outward the steel sheet material in the region pressed by the restraining surface 34-2a of the second pad 34-2.

FIG. 8 is a schematic diagram illustrating a relationship between an extent pressed by the second pad 34-2 in the portion to be formed into the ridge and a maximum decrease rate of sheet thickness in the edge of the flange portion that continues to the ridge 12a or 12b in the outward continuous flange 16 to be formed. In FIG. 8, the pressed extent is represented by a pressing angle that means a central angle of the extent that the second pad 34-2 restrains, where the border between the portion to be formed into each ridge and the portion to be formed into the gutter bottom is set to 0°.

The pressing angle of 0° means a state in which the portion to be formed into the ridge is not restrained.

As shown in FIG. 8, when the portion to be formed into the ridge is not restrained, the maximum decrease rate of sheet thickness in the edge of the flange is approximately 36%, which indicates a high possibility of crack generation of stretched flange. In contrast, when restraining with a pressing angle of 23° or more, in other words, restraining a ridge region of at least ⅓ of the cross-sectional circumference starting from the border, the maximum decrease rate of sheet thickness in the edge of the flange is reduced to less than 25%. Accordingly, this shows that cracking at the edge of the flange is reduced.

FIG. 9 is a characteristic diagram illustrating a relationship between an extent pressed by the second pad 34-2 in the portion to be formed into the ridge and a minimum decrease rate of sheet thickness near the base of the flange in the vicinity of the end of the ridge 12a or 12b to be formed. In FIG. 9, the pressed extent is also represented by the pressing angle as is in FIG. 8. As shown in FIG. 9, when the portion to be formed into the ridge is not restrained, the minimum decrease rate of sheet thickness near the base of the flange is approximately −65%, which apparently leads to wrinkle generation. In contrast, when restraining with a pressing angle of 23° or more, in other words, restraining a ridge region of at least ⅓ of the cross-sectional circumference starting from the border, the minimum decrease rate of sheet thickness near the base of the flange is suppressed to −35% or more. This shows that wrinkling near the base of the flange is reduced.

Subsequently, as the first die 32 moves further toward the first punch 31, the first punch 31 and the first die 32 carry out first stage press forming with the forming material 33 being restrained by the first pad 34-1 and the second pad 34-2, as illustrated in FIG. 10. By doing so, the forming material 33 is press formed into an intermediate product except, for example, for a portion located below the second pad 34-2 in the pressing direction (33A in FIG. 10).

The first stage press forming using the first punch 31 and the first die 32 may be bending forming in which the first die 32 presses and bends the forming material 33 against the first punch 31. Alternatively, the first stage press forming may be deep drawing in which the first die 32 and a blank holder move toward the first punch 31 to carry out press forming while the first die 32 and the blank holder clamp the portions to be formed into the vertical walls in the forming material 33.

At this time, the second pad 34-2 is restraining the region in the vicinity of the end of the portion to be formed into each ridge 12a, 12b (near the border between each ridge 12a, 12b and the outward continuous flange 16), thereby reducing wrinkle generation in the region. In addition, because of the second pad 34-2 restraining this region, the stretch flanging rate of the flange that is formed continuing to the end of each ridge 12a, 12b is reduced, which can thereby reduce crack generation in the outward continuous flange 16. Incidentally, although not shown in FIGS. 4 to 10, part of the curved sections 14a, 14b and the flanges 15a, 15b in the first member 10 illustrated by way of example in FIG. 1 are press formed by the first punch 31 and the first die 32 in the first step.

Figure 11:
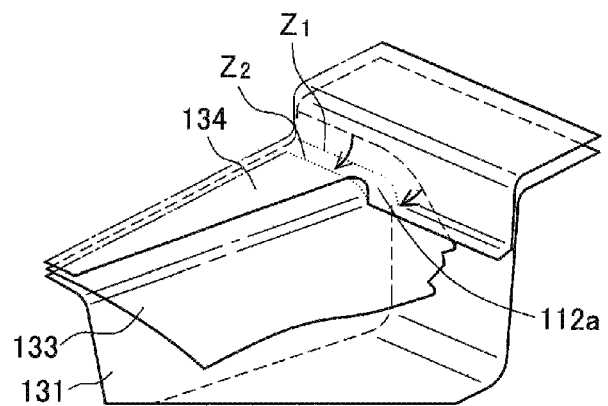
FIG. 11 is a perspective view illustrating an example in which a pad is used to press portions to be formed into a gutter bottom and a ridge simultaneously.
Figure 12:
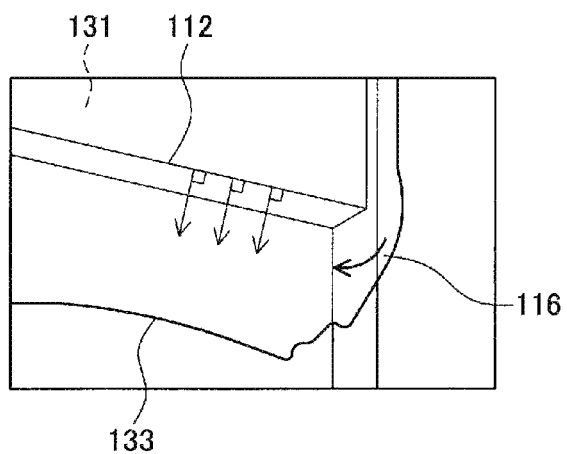
FIG. 12 is a view for illustrating a forming material when a pad that simultaneously presses portions to be formed into the gutter bottom and ridges is used to carry out press forming.

Now, there will be described below reasons why wrinkling near the base of the flange in the end region of the ridge 12a or 12b and cracking in the edge of the outward continuous flange 16 are reduced by using the method of manufacturing the structural member. FIGS. 11 and 12 are views for illustrating a state of the press forming that uses a pad 134 in which the first pad and the second pad are not separated so that a portion to be formed into the gutter bottom and a portion to be formed into the ridge are restrained simultaneously. The structural member to be manufactured is a structural member having the end-spread portion T as shown in FIG. 1 by way of example. FIG. 11, which corresponds to FIG. 7, is a perspective view illustrating a state in which the portion to be formed into the gutter bottom and the portion to be formed into each ridge in a forming material 133 are restrained by a punch 131 and the pad 134. In addition, FIG. 12 is a view in which the forming material 133 is viewed from above when it is pressed by the die.

In the case of using the pad 134, when the pad 134 starts to press and restrain the forming material 133 against the punch 131, the portion to be formed into the ridge is first pressed by the pad 134. In this state, a gap is created between the portion to be formed into the gutter bottom and the pad 134, and the portion to be formed into the gutter bottom is not pressed by the pad. In addition, the structural member having the end-spread shape has different cross-sectional circumferences depending on the location in the longitudinal direction in the vicinity of the end portion to be formed into the gutter bottom. In other words, the cross-sectional circumference at a location $Z_1$ is longer than that at a location $Z_2$ as illustrated in FIG. 11.

Consequently, as illustrated in FIG. 11, the steel sheet material for the portion to be formed into the outward continuous flange results in moving from the portion to be formed into the gutter bottom toward the portion to be formed into the ridge, until the pad 134 restrains both the portion to be formed into the gutter bottom and the portion to be formed into the ridge.

Moreover, as illustrated in FIG. 12, when the structural member has the end-spread shape, the portion to be formed into a vertical wall, which is bent by the die, is bent in a direction perpendicular to a portion 112 to be formed into the ridge, in other words, bent in a direction of moving away from a portion 116 to be formed into the outward continuous flange. This makes it further easier to move the steel sheet material for the portion to be formed into the outward continuous flange toward the portion to be formed into the ridge. Consequently, this causes excessive wrinkling and thickening to occur more frequently in the portion to be formed into the ridge. For this reason, in the case of using the pad 134 that simultaneously restrains the portion to be formed into the gutter bottom and the portion to be formed into the ridge, the wrinkling tends to occur in the end of the portion to be formed into the gutter bottom and in the end of the portion to be formed into the ridge.

In contrast, as illustrated in FIGS. 5 and 7, according to the exemplary manufacturing method, the second pad 34-2 presses and restrains the end of the portion to be formed into each ridge after the first pad 34-1 restrains the portion to be formed into the gutter bottom. Thus, while the end of the portion to be formed into each ridge is pressed by the second pad 34-2, the movement of the steel sheet material toward the portion to be formed into the gutter bottom is reduced. This reduces the movement of the steel sheet material for the portion to be formed into the outward continuous flange toward the portion to be formed into the gutter bottom and toward the portion to be formed into each ridge even though there exist different cross-sectional circumferences depending on the longitudinal location in the end of the portion to be formed into the gutter bottom (in the vicinity of the outward continuous flange).

Moreover, while the portion to be formed into the gutter bottom is restrained by the first pad 34-1, the second pad 34-2 presses the end of the portion to be formed into each ridge. Thereby, the end of the portion to be formed into each ridge is formed so as to project outward the steel sheet material in the pressed region. Furthermore, as illustrated in FIG. 10, the first punch 31 and the first die 32 press form the forming material 33 while the forming material 33 is restrained by the first pad 34-1 and the second pad 34-2. Consequently, an excessive movement of the steel sheet material toward the portion to be formed into the ridges is reduced. As a result, an excessive thickening and wrinkling in the end of each ridge 12a, 12b to be formed are reduced.

(2-3-2. Second Step)

After the first stage press forming has been carried out in the first step as described above, a second stage press forming is carried out in the second step. In the first step, among portions located below the second pads 34-2 in the pressing direction, the portions to be formed into the vertical walls 13a, 13b, which are overlapped by the second pads 34-2, cannot be formed into the final shape as the first member 10. Moreover, there is a case where the whole portions or part of the portions to be formed into the curved sections 14a, 14b and the flanges 15a, 15b in the first member 10 are not be formed into the final shape in the first step, either.

Furthermore, part of the portions to be formed into the ridges 12a, 12b may not be formed into the final shape in the first step, either, depending on the region that the first pad 34-1 and the second pad 34-2 press in the forming material 33. For example, when the second pad 34-2 forms a region of ⅓ of the cross-sectional circumference in the portion to be formed into the ridge 12a or 12b starting from the border between the portion to be formed into the ridge 12a or 12b and the portion to be formed into the gutter bottom 11 in the first step, the remaining region of ⅔ of the cross-sectional circumference needs to be formed later.

Thus, in the second step, the second punch and the second die carry out the second stage press forming using a second press-forming apparatus so as to form the intermediate product into the final shape of the first member 10. The second step can be carried out by a known press forming method using the second punch and the second die that have press surfaces corresponding to portions to be formed into the final shapes. If the second step does not complete forming into the final shape of the first member 10, another forming step may further be added.

Incidentally, the second step may be stamping press forming using only a die and punch without using pads, or may be typical press forming using pads.

<3. Effect>

As described so far, the first member 10 according to the present embodiment has the end-spread portion T and the outward continuous flange 16 at the end thereof, thereby enabling the load transfer properties and the impact energy absorption amount to be improved in the case of crushing along the axial direction. To be specific, providing the first member 10 with the outward continuous flange 16 at an end thereof can restrain stress from being concentrated at the ends of the ridges 12a, 12b at an initial stage of crushing along the axial direction, allowing the stress to be dispersed to other portions. This reduces the strain produced in the ends of the ridges 12a, 12b and thereby improves the load transfer properties. In addition, providing the first member 10 with the end-spread portion T can make the buckling pitch smaller at an intermediate or later stage of crushing along the axial direction. Thus, in combination with the improvement effect of the load transfer properties, this can increase the impact energy absorption amount. Moreover, providing the first member 10 with the end-spread portion T reduces the width of the gutter bottom 11 and thus reduces the cross-sectional circumference of the first member 10 as the distance from the end having the outward continuous flange 16 becomes larger. Consequently, according to the present embodiment, the first member 10 can be made lighter.

Examples

Now, Examples of the present embodiment will be described. Note that, in the description of Examples below, the first member 10, which is the structural member for an automotive body according to the present embodiment, will be described as a press-formed product 10.

(1) Evaluation of Impact Energy Absorption Properties

The impact energy absorption amount were first evaluated by exerting an impact load, in the axial direction, on the end having an outward continuous flange 16 in the press-formed product 10 manufactured according to the exemplary method of manufacturing the structural member as described above.

Figure 13:
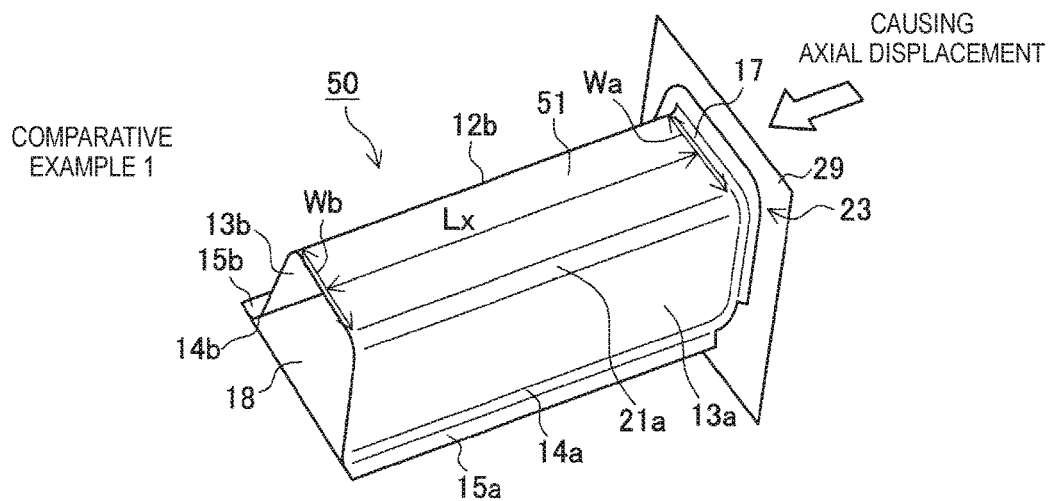
FIG. 13 illustrates analytical models of Example 1 and Comparative Examples 1 and 2.
Figure 13:
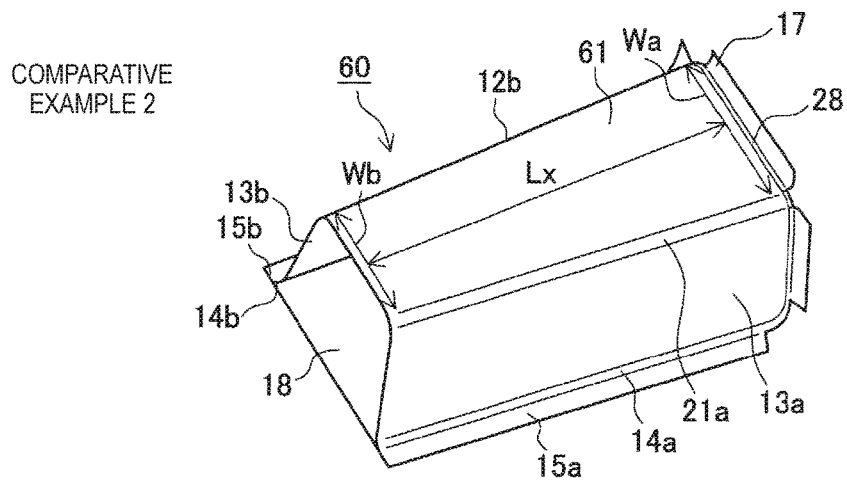
Figure 13:
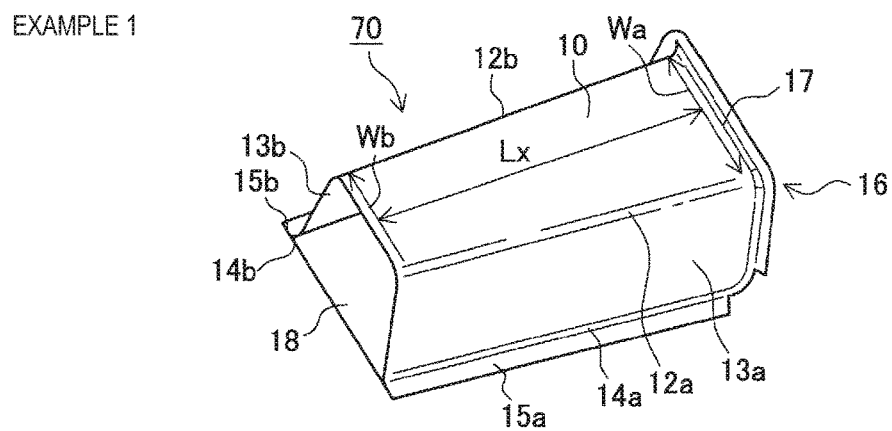

FIG. 13 is a schematic view illustrating analytical models of structural members that were used in the analysis. FIG. 13 illustrates, from top to bottom, an analytical model 50 according to Comparative Example 1, an analytical model 60 according to Comparative Example 2, and an analytical model 70 according to Example 1. In each of the analytical models 50, 60, 70, a press-formed product 51, 61, or 10, which has a substantially gutter-shaped cross section, is joined to the flat-plate second member 18 via the flanges 15a, 15b that continue to the vertical walls 13a, 13b through the curved sections 14a, 14b, respectively.

The analytical model 50 according to Comparative Example 1 has, at an axial end, an outward continuous flange 23 without having notches. However, the analytical model 50 has a shape in which the width of the gutter bottom is constant. Widths Wa, Wb of the gutter bottom are 100 mm. The height of the press-formed product 51 is 100 mm. Lx, which is a length from the border portion between the curved rising surface 17 and the gutter bottom to the end not having the outward flange, is 300 mm. The value S, which represents a degree of width reduction of the gutter bottom as defined in the foregoing formula (1), is 0. The press-formed product 51 of the analytical model 50 is press formed by using the pad (pad 134 in FIG. 11) that simultaneously restrains the portion to be formed into the gutter bottom and the portions to be formed into the ridges.

The analytical model 60 according to Comparative Example 2 has, at an axial end thereof, a discontinuous outward flange 24 having a notch that reaches the end of each ridge 12a, 12b. In addition, the analytical model 60 has a shape in which the width of the gutter bottom decreases as the distance from the end having the outward flange 24 becomes larger. The smallest value of width of the gutter bottom (width Wb) is 100 mm while the largest value (width Wa) is 130 mm. The height of the press-formed product 61 is 100 mm. Lx, which is a length from the border portion between the curved rising surface 17 and the gutter bottom to the end not having the outward flange 24, is 300 mm. The value S, which represents a degree of width reduction of the gutter bottom as defined in the foregoing formula (1), is 0.00077. The press-formed product 61 of the analytical model 60 is press formed by using the pad that restrains only the portion to be formed into the gutter bottom.

The analytical model 70 according to Example 1 has, at an axial end thereof, the outward continuous flange 16 without having notches. In addition, the analytical model 70 has a shape in which the width of the gutter bottom gradually increases toward the end having the outward flange 24, as is similar to Comparative Example 2. The smallest value of width of the gutter bottom (width Wb) is 100 mm while the largest value (width Wa) is 130 mm. The height of the press-formed product 10 is 100 mm. Lx, which is a length from the border portion between the curved rising surface 17 and the gutter bottom to the end not having the outward flange 16, is 300 mm. The value S, which represents a degree of width reduction of the gutter bottom as defined in the foregoing formula (1), is 0.00077. The press-formed product 10 of the analytical model 70 is press formed by using the first pad 34-1 and the second pad 34-2 as illustrated in FIGS. 4 to 10.

Analytical conditions other than the foregoing were all set the same for the analytical models 50, 60, 70. The common analytical conditions are listed as follows.

Steel sheet used: a 1.4 mm thick high-tensile steel sheet having a tensile strength of 980 MPa class Curvature radius of the ridge: 12 mm Curvature radius of each curved section 14a, 14b that continues to each flange 15a, 15b: 5 mm Widths of the outward continuous flange 16 and the outward flange 24: 14 mm Curvature radius r of the curved rising surface 17: 3 mm In conducting the analysis, as illustrated in Comparative Example 1, a rigid wall 29 was made to collide, in the axial direction at a collision speed of 20 km/h, against the end formed with the outward continuous flange 16, 23 or the outward flanges 24 to cause axial displacement in each analytical model 50, 60, 70. The axial load (kN) generated in the collision and the impact energy absorption amount (kJ) were then calculated for each of Example 1 and Comparative Examples 1, 2.

Figure 14:
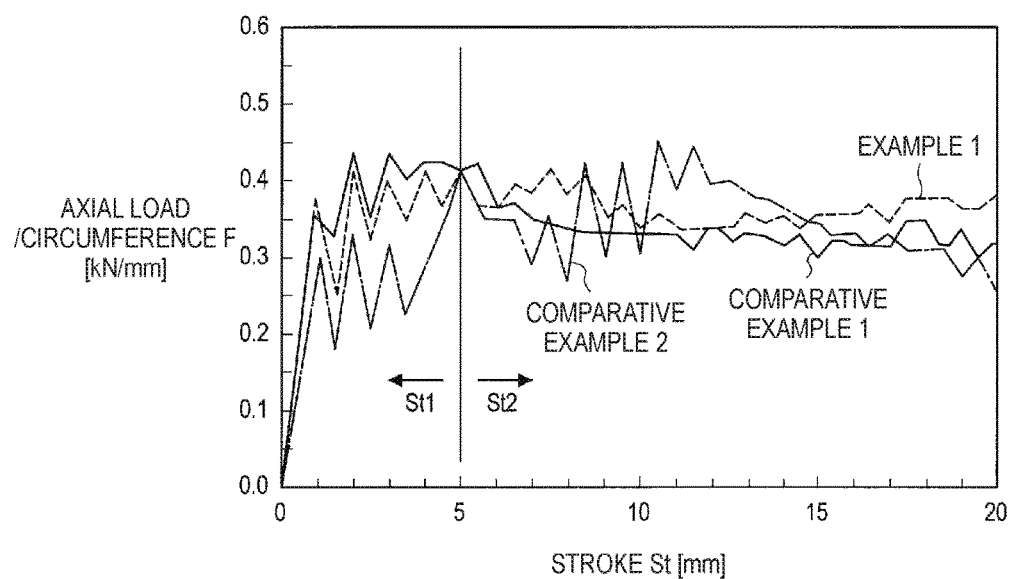
FIG. 14 is a graph representing analytical results on axial loads of the analytical models of Example 1 and Comparative Examples 1 and 2.

FIG. 14 is a graph showing analytical results on the axial load for each of the analytical models 50, 60, 70. Note that the vertical axis of the graph in FIG. 14 represents the value obtained by dividing the axial load by the cross-sectional circumference at the border between the curved rising surface 17 and the gutter bottom (axial load/circumference: kN/mm) so as to exclude the influence of the cross-sectional circumference at the end of each analytical model 50, 60, 70. In this case, the cross-sectional circumference means the length at the center of the sheet thickness of the cross section of each press-formed product 10, 51, or 61, from which the second member 18 is excluded.

In an initial region St1 of axial crushing in which a crush stroke is 5 mm or less, the analytical models 50, 70 of Comparative Example 1 and Example 1, which have respective outward continuous flanges 23 and 16 without having notches, have exhibited higher axial loads (kN/mm) than those of the analytical model 60 of Comparative Example 2 having the outward flange 24 that has notches. In the region St2 in which the crush stroke is exceeding 5 mm, the analytical models 60, 70 of Comparative Example 2 and Example 1 each having the end-spread portion have exhibited roughly higher axial loads (kN/mm) than those of the analytical model 50 of Comparative Example 1 having the constant gutter bottom width.

The analytical model 70 of Example 1, which includes the press-formed product 10 having the outward continuous flange 16 and the end-spread portion, has exhibited high axial loads from the initial stage to the late stage of the axial crushing. In particular, the analytical model 70 of Example 1 has sustained high axial loads also in the late stage of axial crushing in which the crush stroke exceeds 15 mm.

Figure 15:
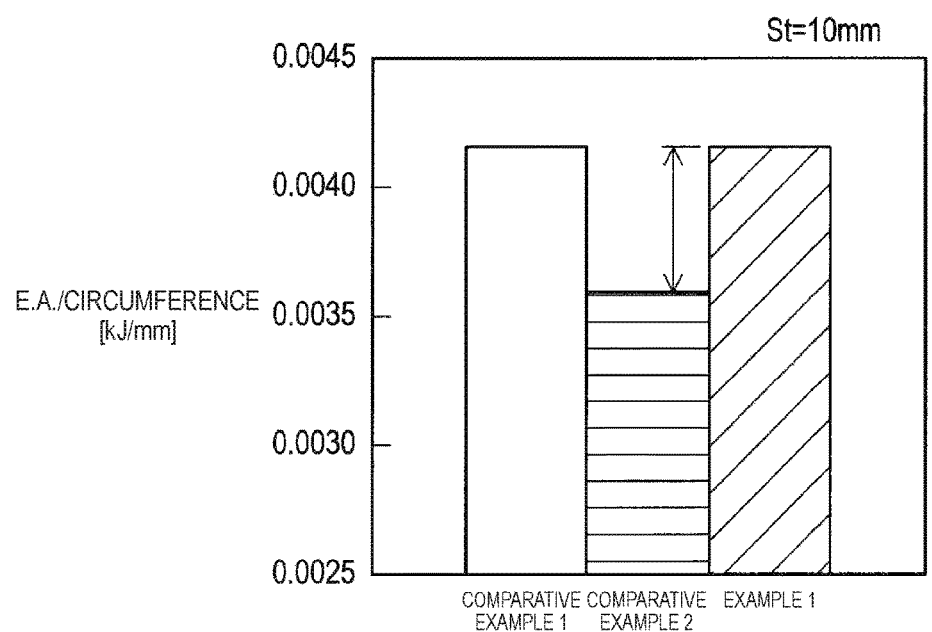
FIG. 15 is a graph representing analytical results on impact energy absorption amount at a crush stroke of 10 mm.
Figure 16:
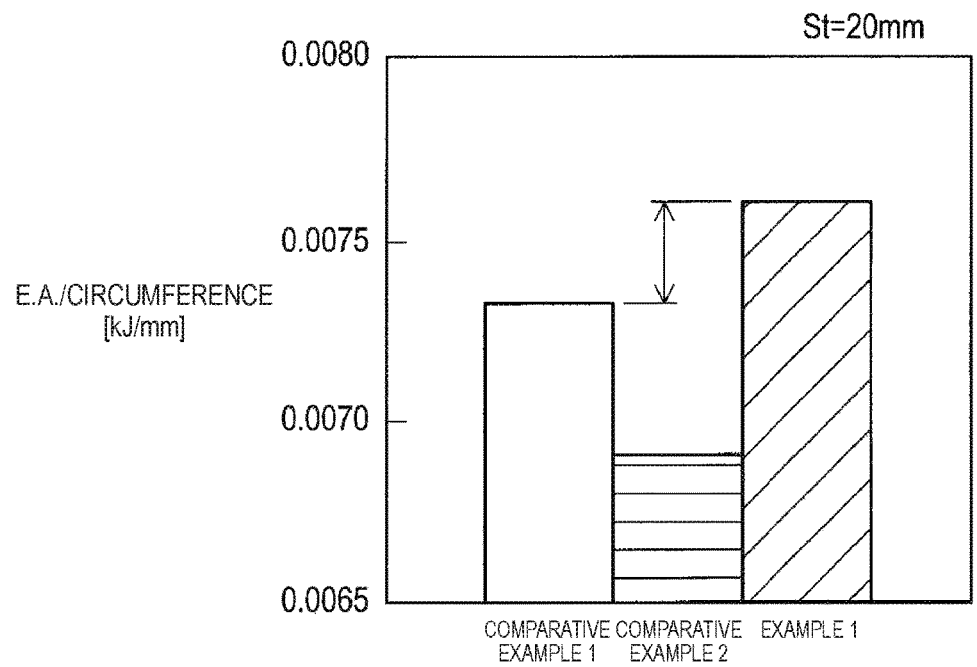
FIG. 16 is a graph representing analytical results on impact energy absorption amount at a crush stroke of 20 mm.

In addition, FIGS. 15 and 16 are graphs showing analytical results on the impact energy absorption amount (E.A.) for each analytical model 50, 60, 70. FIG. 15 shows analytical results at a crush stroke St of 10 mm, and FIG. 16 shows analytical results at a crush stroke St of 20 mm.

As shown in FIG. 15, the impact energy absorption amount at a crush stroke St of 10 mm is apparently increased for the analytical models 50, 70 that have respective outward continuous flanges 16, 23 having no notch at the axial end, as compared to the analytical model 60 that has the outward flange 24 with notches. Moreover, as shown in FIG. 16, the impact energy absorption amount at a crush stroke St of 20 mm is apparently increased for the analytical models 60, 70 each having the end-spread portion, as compared to the analytical model 50 having the constant gutter bottom width.

Thus, the load transfer properties of the analytical model 70 of Example 1 are such that the impact energy absorption properties are superior, in any of the initial stage and the late stage of collision, to those of the analytical model 50 of Comparative Example 1 and the analytical model 60 of Comparative Example 2.

(2) Evaluation of Effects of Degree of Reduction

Next, the degree of width reduction of the gutter bottom in the press-formed products 10, 61 of the analytical models 70, 60 of Example 1 and Comparative Example 2 was changed and its effect on the impact energy absorption amount was evaluated. In Examples 2 to 10 and Comparative Example 3, the degree of reduction of the foregoing press-formed product 10 of Example 1 was changed by way of changing the width Wb of the gutter bottom at the end opposite to the end having the outward continuous flange 16. In Comparative Examples 4 to 13, the degree of reduction of the foregoing press-formed product 61 of Comparative Example 2 was changed by way of changing the width Wb of the gutter bottom at the end opposite to the end having the outward flange 24.

For Example 2 and Comparative Example 4, the width Wb of the gutter bottom is 55 mm and the value S of the degree of reduction is 0.00192. For Example 3 and Comparative Example 5, the width Wb of the gutter bottom is 60 mm and the value S of the degree of reduction is 0.00179. For Example 4 and Comparative Example 6, the width Wb of the gutter bottom is 65 mm and the value S of the degree of reduction is 0.00166. For Example 5 and Comparative Example 7, the width Wb of the gutter bottom is 70 mm and the value S of the degree of reduction is 0.00154. For Example 6 and Comparative Example 8, the width Wb of the gutter bottom is 85 mm and the value S of the degree of reduction is 0.00115. For Example 7 and Comparative Example 9, the width Wb of the gutter bottom is 100 mm and the value S of the degree of reduction is 0.00077. For Example 8 and Comparative Example 10, the width Wb of the gutter bottom is 115 mm and the value S of the degree of reduction is 0.00038. For Example 9 and Comparative Example 11, the width Wb of the gutter bottom is 120 mm and the value S of the degree of reduction is 0.00025. For Example 10 and Comparative Example 12, the width Wb of the gutter bottom is 125 mm and the value S of the degree of reduction is 0.00013. For Comparative Example 3 and Comparative Example 13, the width Wb of the gutter bottom is 130 mm and the value S of the degree of reduction is 0.

Figure 17:
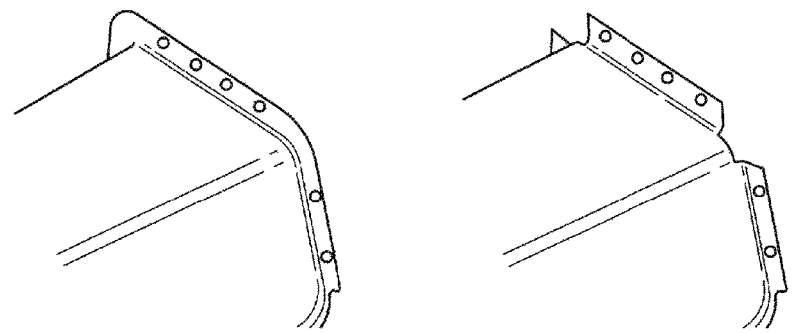
FIG. 17 is a view for illustrating an evaluation method on Examples 2 to 10 and Comparative Examples 3 to 13.

As illustrated in FIG. 17, in all of Examples 2 to 10 and Comparative Examples 3 to 13, the end of each press-formed product 10, 61 was joined to another member by spot welding at four spots in the flange portion corresponding to the gutter bottom and two spots in the flange portion corresponding to each of the vertical walls.

Figure 18:
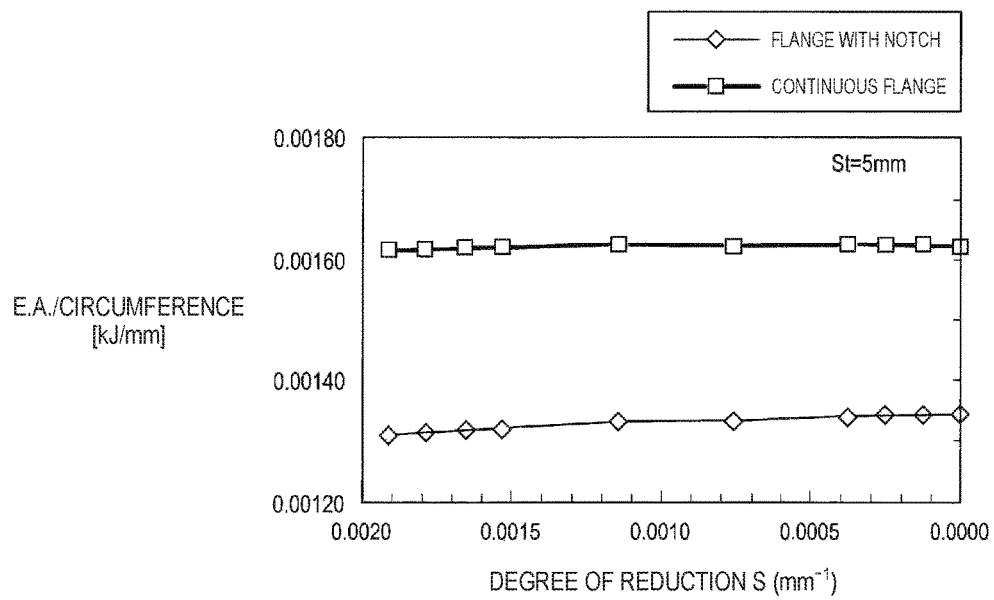
FIG. 18 is a graph illustrating a relationship between degree of width reduction of the gutter bottom and impact energy absorption amount at a crush stroke of 5 mm.
Figure 19:
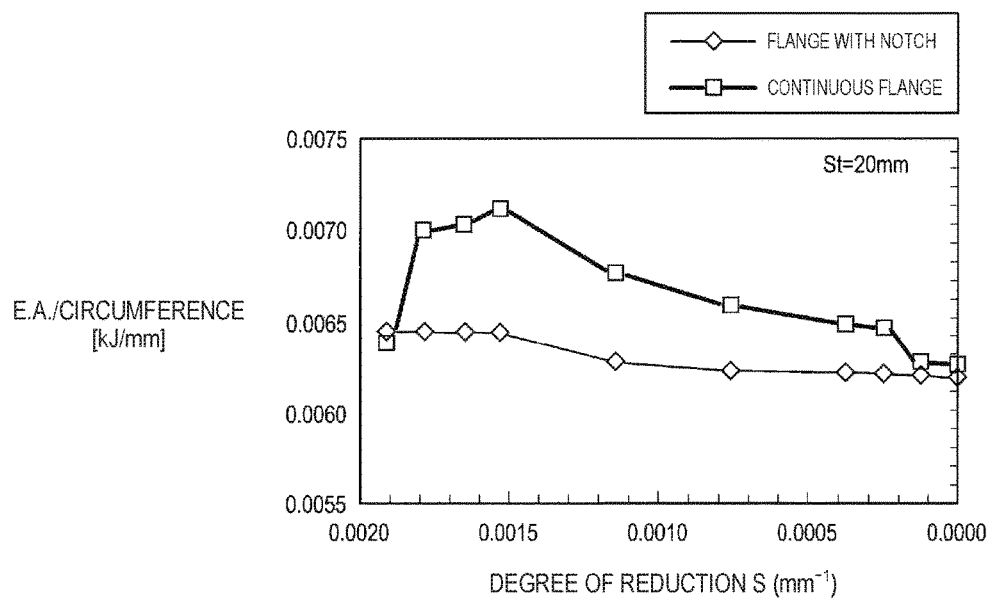
FIG. 19 is a graph illustrating a relationship between degree of width reduction of the gutter bottom and impact energy absorption amount at a crush stroke of 20 mm.

FIGS. 18 and 19 each show a relationship between the impact energy absorption amount and the value S of the degree of reduction for the press-formed product 10 having the outward continuous flange 16 and the press-formed product 61 having the outward flange 24 that has a notch at a position corresponding to each ridge, at a crush stroke St of 5 mm and 20 mm, respectively.

As shown in FIG. 18, at a crush stroke St of 5 mm, each of the analytical models 60, 70 did not exhibit remarkable variation in the impact energy absorption amount when the value S of the degree of reduction was varied. In addition, when the analytical models 60, 70 are compared to each other at the same value S of the degree of reduction, the impact energy absorption amount of the analytical model 70 having the outward continuous flange 16 exceeds that of the analytical model 60 having the outward flange 24 with notches. This result is brought because the strain at the end of the press-formed product 61 having the outward flange 24 with notches was increased due to stress concentration at the ends of the ridges of the press-formed product 61.

In addition, as shown in FIG. 19, the impact energy absorption amount of the analytical model 70 having the outward continuous flange 16 exceeds that of the analytical model 60 having the outward flange 24 with notches in a range of 0.0002 to 0.0018 of the value S of the degree of reduction at a crush stroke St of 20 mm. This result is brought due to the outward continuous flange 16 that dispersed stress in portions other than the ridges, and also due to the end-spread portion that induced buckling with smaller buckling pitches to occur successively from the end. There is shown a tendency that the impact energy absorption amount of the analytical model 70 having the outward continuous flange 16 stably increases especially in a range of 0.00025 to 0.0015 of the value S of the degree of reduction.

Figure 20:
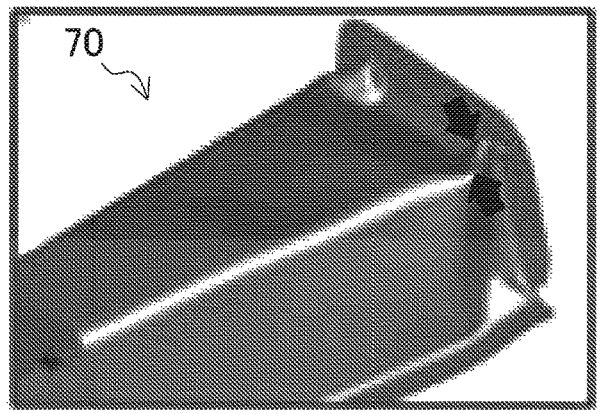
FIG. 20 illustrates views showing states of buckling of analytical models of Example 6 and Comparative Examples 3 and 8.
Figure 20:
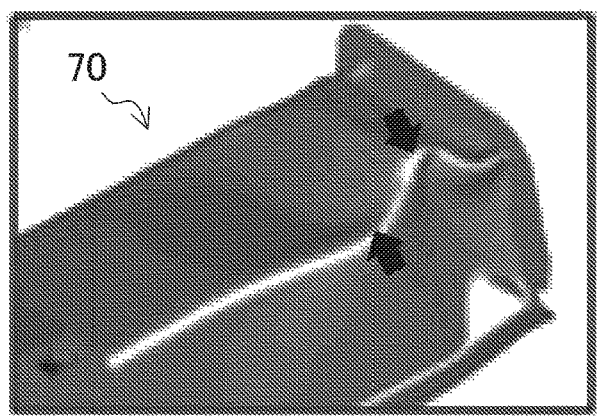
Figure 20:
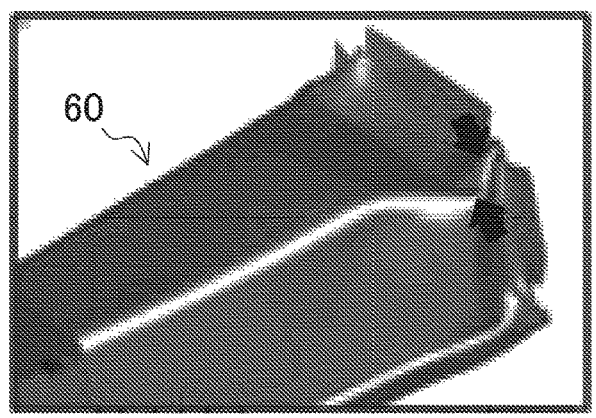

FIG. 20 illustrates a state of buckling of each of the analytical models 60 and 70 of Example 6 and Comparative Examples 3 and 8 at a crush stroke St of 20 mm. As shown in FIG. 20, the analytical model 70 of Example 6, which include the press-formed product 10 having the outward continuous flange 16 at an end thereof and the end-spread portion T, exhibits buckling generated closer to the end and the buckling pitch is made smaller.

As described above, it is found that when the press-formed product 10 has the outward continuous flange 16 at an end thereof and the value S that represents the degree of reduction of the end-spread portion is within a range of 0.0002 to 0.0018, the load transfer properties when an impact load is applied are improved from the initial stage to the intermediate or later stage in the crush stroke, leading to an increase in the impact energy absorption amount. It can be readily understood that providing the press-formed product 10 with the end-spread portion T can make the cross-sectional circumference shorter and thus can make the press-formed product 10 lighter.

However, as the degree of reduction of the end-spread portion becomes small, the flange rising angle of the outward continuous flange 16 that continues to the gutter bottom becomes larger, which leads to the vulnerability to crack and wrinkle generation in the flange formed at the end of the ridge. Thus, it is preferable that the value S of the degree of reduction of the end-spread portion be within a range of 0.0005 to 0.0018 when formability and productivity are taken into consideration.

(3) Evaluation of Effects of Degree of Height Reduction of Vertical Wall

Figure 21:
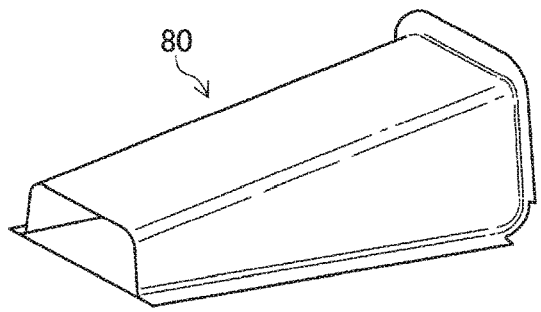
FIG. 21 illustrates analytical models in which only vertical walls are reduced.
Figure 21:
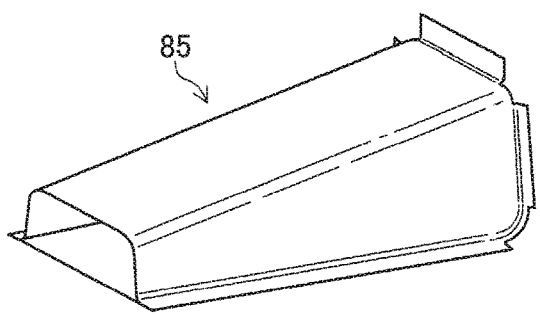
Figure 21:
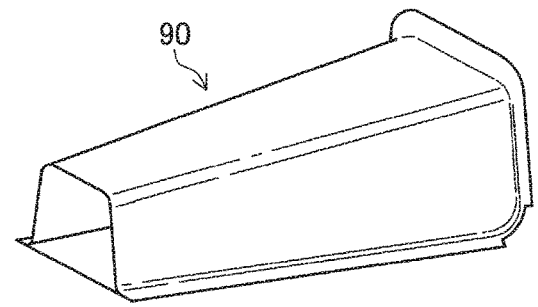
Figure 21:
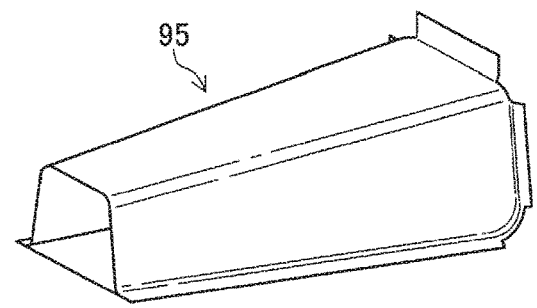

Next, the impact energy absorption amount was evaluated when the height (width) of the vertical walls, instead of the gutter bottom, in the press-formed product is reduced as the distance from the end having the outward continuous flange becomes larger. FIG. 21 illustrates analytical models 80, 85, which include a press-formed product with only the vertical walls being reduced, and analytical models 90, 95, which include a press-formed product with both of the gutter bottom and the vertical walls being reduced. The analytical models 80, 90 have the outward continuous flange without notches at positions corresponding to the ridges while the analytical models 85, 95 have the outward flange with notches at positions corresponding to the ridges.

These analytical models 80, 85, 90, 95 have the same configuration as the foregoing analytical models 50, 60, 70, except for the gutter bottom or the vertical walls being reduced. In addition, the evaluation method for the impact energy absorption amount is the same as in the evaluation in (2). However, evaluation was conducted with these press-formed products being restrained, lest the rigid wall 29 (see FIG. 13) generate displacement other than axial displacement, so as to prevent the press-formed product from toppling.

Figure 22:
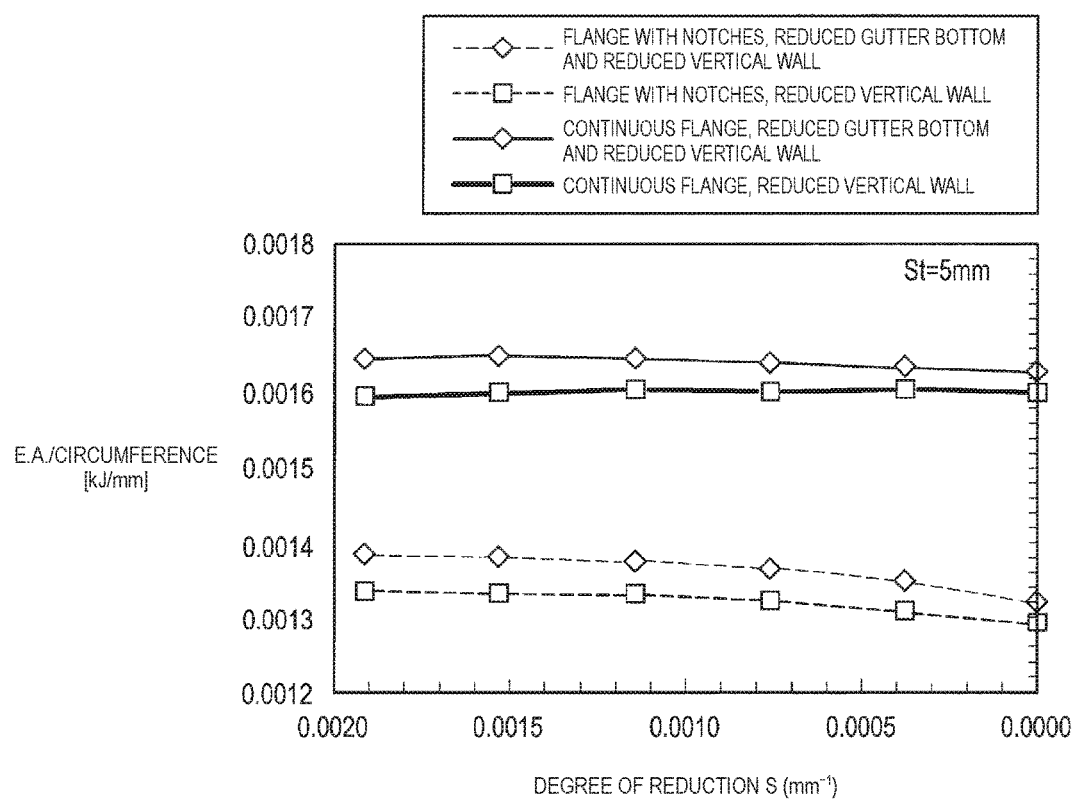
FIG. 22 is a graph illustrating a relationship between degree of width reduction of the gutter bottom or of height reduction of the vertical walls and impact energy absorption amount at a crush stroke of 5 mm.
Figure 23:
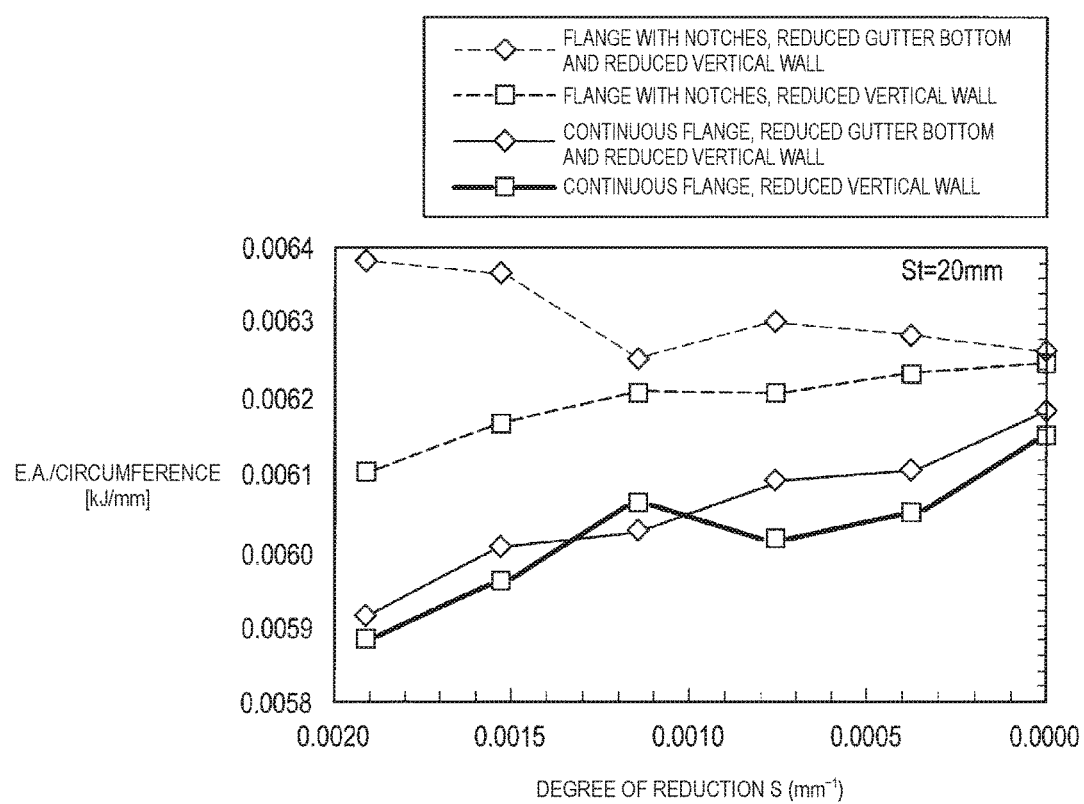
FIG. 23 is a graph illustrating a relationship between degree of width reduction of the gutter bottom or of height reduction of the vertical walls and impact energy absorption amount at a crush stroke of 20 mm.

FIGS. 22 and 23 show a relationship between the impact energy absorption amount and the value S of the degree of reduction for each analytical model 80, 85, 90, 95, at respective crushing strokes St of 5 mm and 20 mm. Note that in the case of reducing only the vertical walls with the width of the gutter bottom being constant, the value S of the degree of reduction represents a degree of height reduction of each vertical wall. In addition, in the case of reducing both the gutter bottom and the vertical walls, the value S of the degree of reduction represents each of the degree of height reduction of the vertical walls and the degree of width reduction of the gutter bottom. In other words, even if the values S of the degree of reduction are the same in the analytical models 80, 90, the cross-sectional circumferences at the end opposite to the end having the outward continuous flange become different to an extent corresponding to the difference between the widths of the gutter bottoms.

As shown in FIG. 22, the impact energy absorption amount of the analytical models 80, 90 having the outward continuous flange exceeded those of the analytical models 85, 95 having the outward flange with notches at a crush stroke St of 5 mm, irrespective of the degree of reduction. In addition, the analytical models 80, 90 having the outward continuous flange did not exhibit remarkable variation in the impact energy absorption amount when the variation in the degree of reduction was varied. Moreover, even when the analytical models 80, 90 were compared to each other at the same degree of reduction, the impact energy absorption amounts of the analytical models 80, 90 did not exhibit an appreciable difference.

In contrast, as shown in FIG. 23, the impact energy absorption amount of the analytical models 80, 90 having the outward continuous flange became smaller than those of the analytical models 85, 95 that included the outward flange with notches at a crush stroke St of 20 mm, irrespective of the degree of reduction. In addition, in the analytical models 80, 90 having the outward continuous flange, the impact energy absorption amount became smaller as the degree of reduction became larger. The analytical model 90 in which both of the gutter bottom and the vertical walls were reduced exhibited larger impact energy absorption amounts than those of the analytical model 80 in which only the vertical walls were reduced, except in a range in which the value S of the degree of reduction was around 0.00115.

Incidentally in FIGS. 22 and 23, when the value S of the degree of reduction is 0, the analytical model 80 and the analytical model 90, both of which have the outward continuous flange, must exhibit the same impact energy absorption amount. Similarly, when the value S of the degree of reduction is 0, the analytical model 85 and the analytical model 95, both of which have the flange with notches, must exhibit the same impact energy absorption amount. However, in this evaluation, the press-formed product is restrained so as not to generate displacement other than that in the axial direction by the rigid wall 29 (see FIG. 13), as described above. This causes difference in the impact energy absorption amount when the value S of the degree of reduction is 0.

Figure 24:
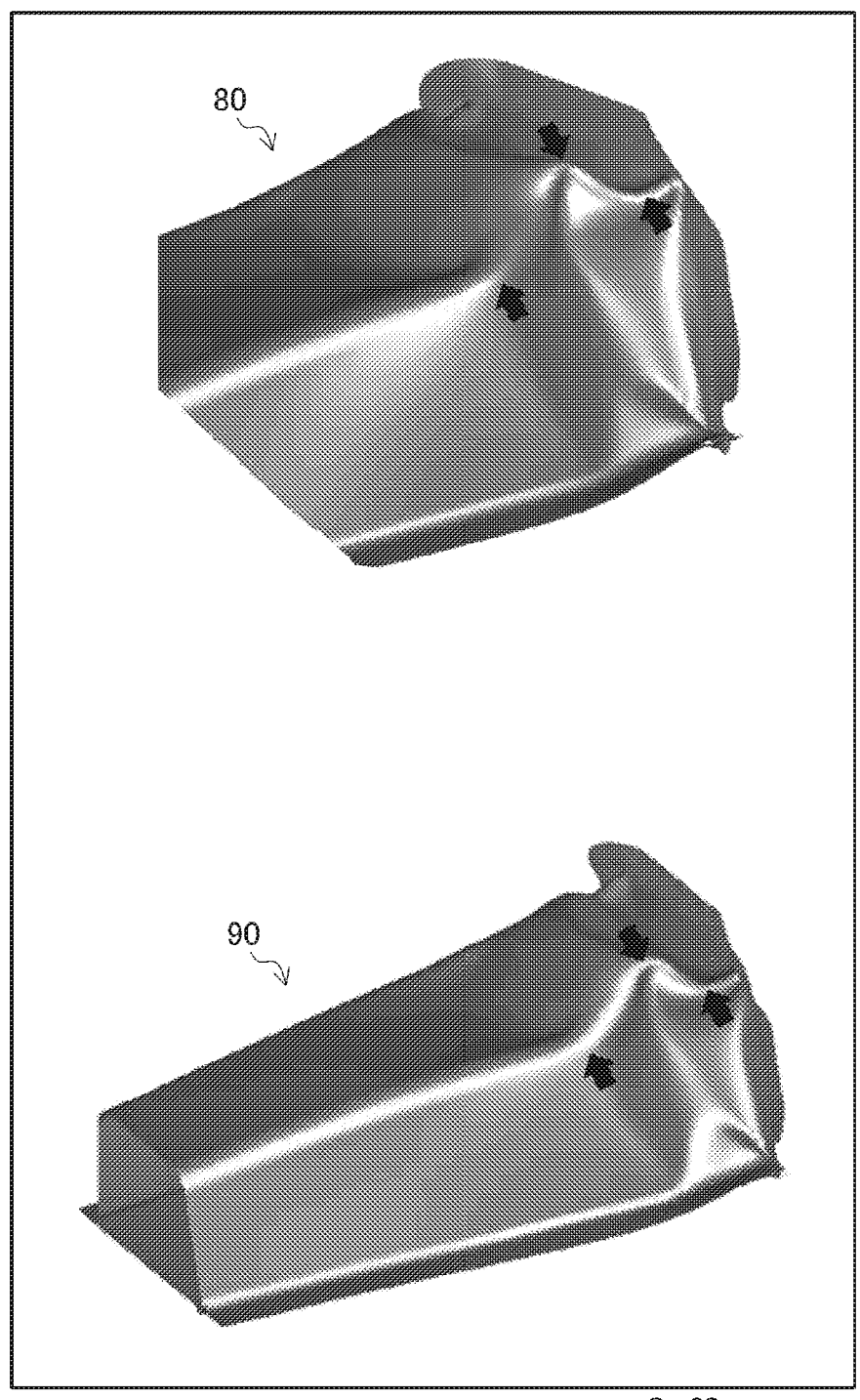
FIG. 24 illustrates views depicting a state of buckling of each analytical model at a crush stroke of 20 mm.

FIG. 24 illustrates a state of buckling of each analytical model 80, 90 at a crush stroke St of 20 mm. As shown in FIG. 24, generated buckling pitches are found to become larger in any of the analytical models 80, 90.

As described so far, it is found that when the height of the vertical walls is reduced as the distance from the end having the outward continuous flange becomes larger, the load borne by the ridges becomes smaller, irrespective of reduction or non-reduction of the width of the gutter bottom, thereby lowering the impact energy absorption amount. It is thus found that reducing the vertical walls cannot improve the effect of providing the end of the press-formed product with the outward continuous flange.

(4) Formability of Outward Continuous Flange (For Reference)

For reference purposes, decrease rate of sheet thickness at the end of the ridge in the press-formed product 10 manufactured according to the above-described method of manufacturing a press-formed product was evaluated. In Reference Example 1, a press-formed product 10 was manufactured by using the first pad 34-1 and the second pad 34-2 according to the above-described method of manufacturing a press-formed product. In Reference Example 2, a press-formed product was also manufactured with the same conditions as in Reference Example 1, except for using a pad that restrained only a gutter bottom instead of using the first pad and the second pad. Further, in Reference Example 3, a press-formed product was manufactured with the same conditions as in Reference Example 1, except for using a pad that restrained the gutter bottom and the ridges simultaneously instead of using the first pad and the second pad.

A forming material 33 used was a 1.4 mm thick steel sheet having a tensile strength of 980 MPa class measured by tensile testing according to JIS Z 2241. In the press-formed product, the height of the substantially gutter-shaped cross section was 100 mm, the maximum value of the width of the gutter bottom (width Wa) at the end having the outward flange was 148 mm, the minimum width of the gutter bottom (width Wb) was 76 mm, the value S of the degree of reduction of the width W of the gutter bottom was 0.0027, and the width of the outward continuous flange was 14 mm. The shoulders of a punch used had a curvature radius of 12 mm.

Figure 25:
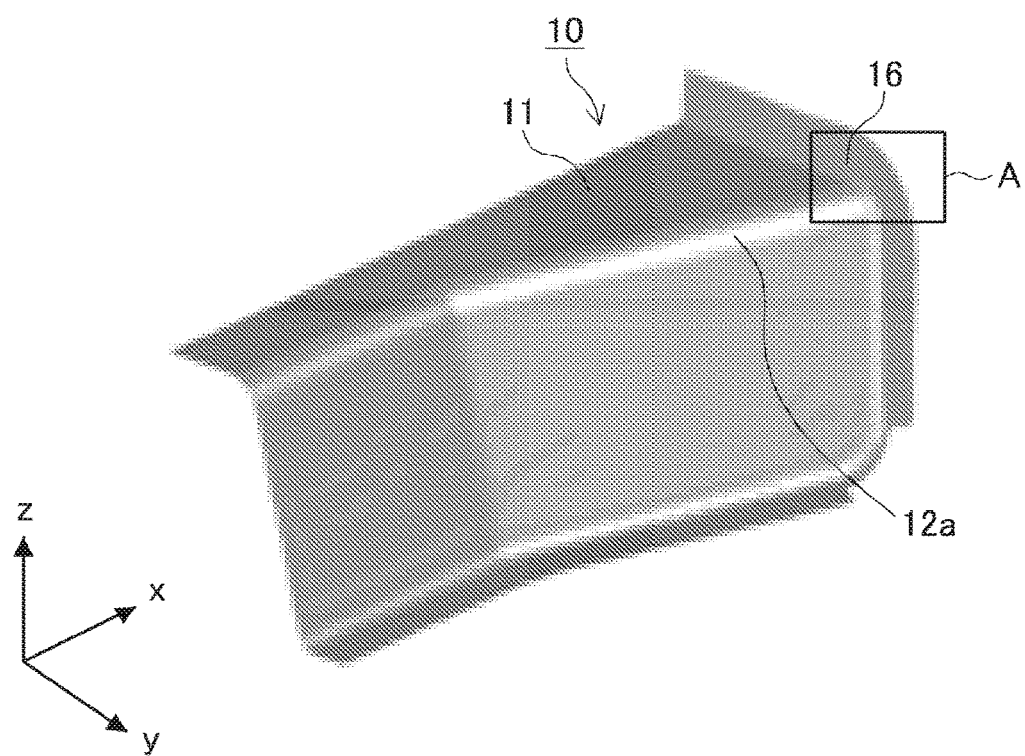
FIG. 25 is a schematic view showing a point at which decrease rate of sheet thickness of a press-formed product is analyzed.
Figure 26:
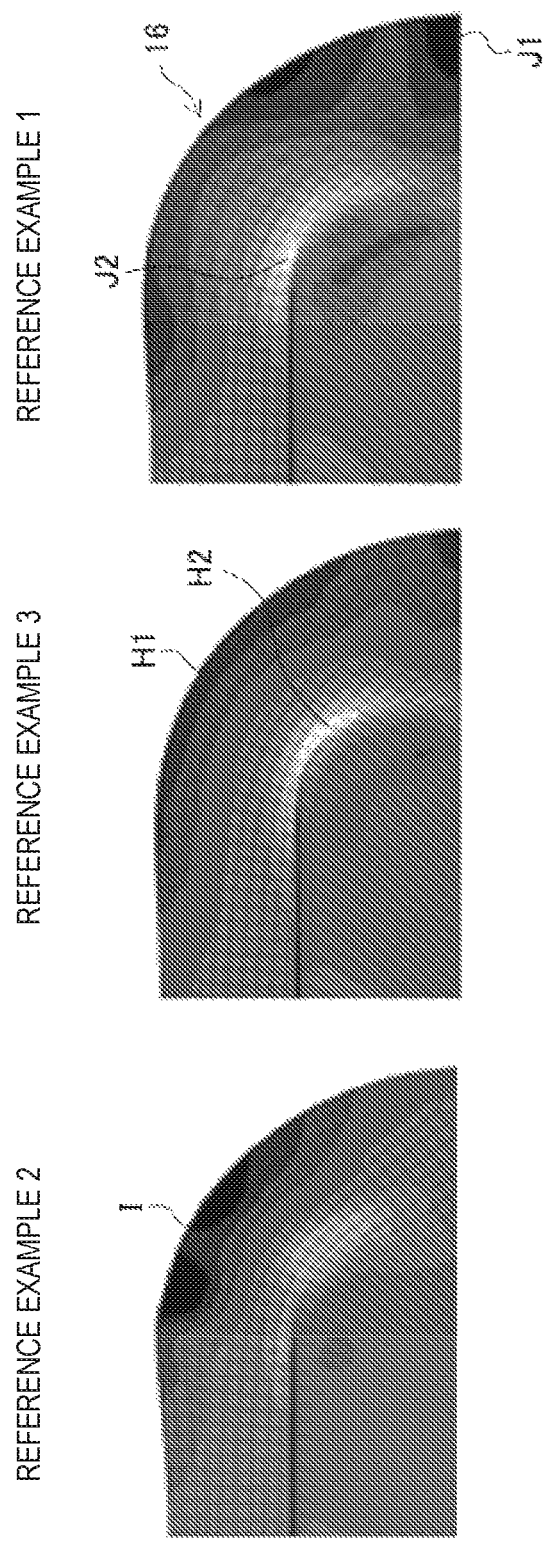
FIG. 26 illustrates views showing analytical results of decrease rate of sheet thickness.
Figure 27:
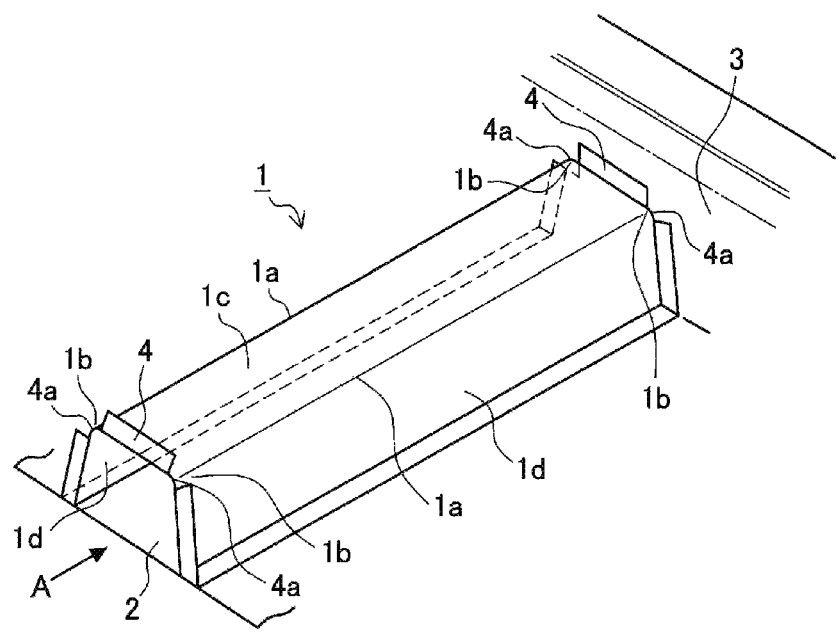
FIG. 27 is a perspective view illustrating a floor cross member as a known structural member.

FIGS. 25 and 26 are schematic views showing analytical results on the decrease rate of sheet thickness for the press-formed products of Reference Examples 1 to 3. FIG. 25 is a view showing an analysis position A for the decrease rate of sheet thickness. In FIG. 25, one half of the press-formed product 10, which is divided in half at the center line along the axial direction (x direction), is shown. FIG. 26 shows analytical results of sheet thickness for each of the press-formed products of Reference Examples 1 to 3. For the analysis, LS-DYNA, a general-purpose analysis software application, was used.

The press-formed product according to Reference Example 2, which used the pad restraining only the gutter bottom, exhibited a decrease rate of sheet thickness of 24.8% at a location I in the flange that was formed so as to continue to the end of the ridge in the outward continuous flange. Such a decrease rate of sheet thickness raises the concern of generating forming defects (cracking). The press-formed product according to Reference Example 2, which used the pad restraining the gutter bottom and the ridges simultaneously, exhibited a decrease rate of sheet thickness of as low as 11.2% at a location H1 in the flange that was formed so as to continue to the end of the ridge in the outward continuous flange. On the other hand, the press-formed product according to Reference Example 3 exhibited a decrease rate of sheet thickness of −15.5% at a location H2 in the curved rising surface between the end of the ridge and the outward continuous flange, which raises the concern of wrinkling and thickening beyond tolerance. As shown, when the flange provided at the end of the press-formed product is made as the outward continuous flange, cracks tend to be generated in the flange formed at the end of the ridge and wrinkles tend to be generated at the base of the flange. Thus, the outward continuous flange has not hitherto been applied to commercial products.

In contrast, the press-formed product according to Reference Example 1, which used the first pad and the second pad, exhibited a decrease rate of sheet thickness of 15.4% at a location J1 in the flange formed so as to continue to the end of the ridge in the outward continuous flange 16, which was within tolerance. Moreover, the decrease rate of sheet thickness was −13.9% at a location J2 in the curved rising surface between the end of the ridge and the outward continuous flange 16, with which generated wrinkling and thickening were within tolerance. In other words, it is found that when the first member 10 is manufactured as the structural member according to the present embodiment by using the above-described method of manufacturing a press-formed product, crack generation in the flange edge of the outward continuous flange 16 and wrinkle generation at the base of the flange are reduced. Thus, the structural member according to the present embodiment can be manufactured by using a high-tensile steel sheet.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

For example, the structural member formed of the press-formed product that is obtained by press forming a steel sheet has been described in the foregoing embodiment by way of example. However, a material constituting the structural member is not limited to such an example. For example, the structural member may be a press-formed product that is obtained by press forming a metal sheet other than a steel sheet, such as a sheet of iron, aluminum, titanium, stainless steel, etc.

Moreover, in order to obtain effects of improving load transfer properties and increasing the impact energy absorption amount during crushing in the axial direction, the structural member may be a metal structural member formed by a method other than press forming. Furthermore, in order to obtain such effects, the structural member may be formed of a resin material or a fiber-reinforced resin containing reinforcing fiber, such as carbon fiber.

In addition, as application examples of the structural member, chassis of vehicles, such as automobiles, trains, and motorcycles, or hulls of ships have been indicated in the above-described embodiment. However, the present invention is not limited to such examples. The structural member may be used for any other structures, such as machines or buildings, if an impact load can be applied in the axial direction of the structures.

REFERENCE SIGNS LIST 10 first member (structural member for automotive body, press-formed product)
11 gutter bottom
12a, 12b ridge
13a, 13b vertical wall
14a, 14b curved section
15a, 15a flange
16 outward continuous flange
17 curved rising surface
18 second member
23 outward continuous flange
24 outward flange
29 rigid wall
50, 60, 70, 80, 90 analytical model
51, 61 press-formed product
100 joined structure
T end-spread portion
W width of gutter bottom
Wa width of gutter bottom at base portion of outward continuous flange
Wb width of gutter bottom at position being arbitrarily distant from base portion

The invention claimed is:

1. A structural member made of metal, formed so as to extend long in a predetermined direction, and having a gutter bottom, two ridges continuing to both ends in a width direction of the gutter bottom, and two vertical walls continuing to the two ridges, the structural member comprising:
    an outward continuous flange continuously formed at least along the gutter bottom, the ridges, and the vertical walls at an end of the structural member in the predetermined direction,
    wherein a width of the gutter bottom is reduced as a distance from the end having the outward continuous flange becomes larger,
    wherein a value S (mm$^{-1}$) that represents a degree of width reduction of the gutter bottom as defined in formula (1) below is in a range from 0.0002 to 0.0018, $$S(\text{mm}^{-1}) = \{(Wa - Wb)/Wa\}/L \qquad (1)$$

where Wa represents a width of the gutter bottom at a base portion at the end having the outward continuous flange, and Wb represents a width of the gutter bottom at a position having an arbitrary distance L from the base portion in an extent in which the width of the gutter bottom becomes smaller.

2. The structural member according to claim 1, wherein the width of the gutter bottom becomes smaller in an extent in which the distance from the end having the outward continuous flange is 100 mm or more.

3. The structural member according to claim 1, wherein the structural member is joined to another member via the outward continuous flange by using resistance spot welding, penetration laser welding, arc fillet welding, adhesion using an adhesive, or a combination thereof.

4. The structural member according to claim 1, wherein the structural member is formed of a high-tensile steel sheet having a tensile strength of 390 MPa or more.

5. The structural member according to claim 1, wherein the structural member is a structural member for a vehicle.

6. The structural member according to claim 5, wherein the structural member for a vehicle is a floor cross member, a side sill, a front side member, or a floor tunnel brace.

* * * * *